(12) United States Patent
Kudekar et al.

(10) Patent No.: US 9,984,035 B2
(45) Date of Patent: May 29, 2018

(54) EFFICIENT ENCODING AND DECODING ARCHITECTURE FOR HIGH-RATE DATA TRANSFER THROUGH A PARALLEL BUS

(71) Applicant: QUALCOMM Incorporated, San Diego, CA (US)

(72) Inventors: Shrinivas Kudekar, Bridgewater, NJ (US); Urs Niesen, Summit, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 333 days.

(21) Appl. No.: 14/837,806

(22) Filed: Aug. 27, 2015

(65) Prior Publication Data

US 2017/0060806 A1 Mar. 2, 2017

(51) Int. Cl.
*G06F 13/42* (2006.01)
*G06F 13/40* (2006.01)

(52) U.S. Cl.
CPC ...... *G06F 13/4221* (2013.01); *G06F 13/4068* (2013.01); *G06F 13/4204* (2013.01)

(58) Field of Classification Search
None
See application file for complete search history.

(56) References Cited

U.S. PATENT DOCUMENTS

| | | | |
|---|---|---|---|
| 7,400,276 B1 | 7/2008 | Sotiriadis et al. | |
| 7,505,505 B2 | 3/2009 | Buckwalter et al. | |
| 8,593,305 B1 | 11/2013 | Tajalli et al. | |
| 8,614,634 B2 | 12/2013 | Sudhakaran et al. | |
| 8,649,460 B2 | 2/2014 | Ware et al. | |
| 8,755,426 B1 | 6/2014 | Cronie et al. | |
| 8,964,879 B2 * | 2/2015 | Navid | H04L 1/0083 375/219 |
| 9,014,251 B2 | 4/2015 | Cronie et al. | |
| 9,014,295 B1 | 4/2015 | Cronie et al. | |
| 9,077,386 B1 | 7/2015 | Holden et al. | |
| 9,083,576 B1 | 7/2015 | Hormati | |
| 9,203,402 B1 | 12/2015 | Tajalli et al. | |
| 9,300,503 B1 | 3/2016 | Holden et al. | |
| 9,362,962 B2 | 6/2016 | Simpson et al. | |
| 9,363,114 B2 | 6/2016 | Shokrollahi et al. | |

(Continued)

OTHER PUBLICATIONS

International Search Report and Written Opinion—PCT/US2016/044592—ISA/EPO—dated Nov. 15, 2016.

*Primary Examiner* — Idriss N Alrobaye
*Assistant Examiner* — Richard B Franklin
(74) *Attorney, Agent, or Firm* — Loza & Loza LLP

(57) ABSTRACT

System, methods, and apparatus are described that facilitate transmission/reception of data over a multi-line parallel bus. In an example, the apparatus selects from a sequential series of data bits a plurality of data bits for transmission over a plurality of parallel bus lines. For each bus line of the plurality of parallel bus lines, the apparatus compares a state of a current data bit selected for transmission on a current bus line during a current clock cycle with one or more conditions related to the current bus line or at least one bus line adjacent to the current bus line, wherein the one or more conditions includes a state of two data bits respectively transmitted on two bus lines adjacent to the current bus line during a previous clock cycle, and determines whether to transmit the current data bit on the current bus line based on the comparison.

28 Claims, 14 Drawing Sheets

(56) References Cited

U.S. PATENT DOCUMENTS

| | | |
|---|---|---|
| 9,413,384 B1 | 8/2016 | Tajalli et al. |
| 9,564,994 B2 | 2/2017 | Shokrollahi et al. |
| 9,577,664 B2 | 2/2017 | Tajalli et al. |
| 2009/0182918 A1 | 7/2009 | Hollis |
| 2012/0254488 A1 | 10/2012 | Lee |
| 2014/0270026 A1 | 9/2014 | Sengoku et al. |
| 2015/0381346 A1 | 12/2015 | Holden et al. |
| 2016/0211929 A1 | 7/2016 | Holden et al. |

* cited by examiner

EFFICIENT ENCODING AND DECODING ARCHITECTURE FOR HIGH-RATE DATA TRANSFER THROUGH A PARALLEL BUS

BACKGROUND

Field

The present disclosure relates generally to high-speed data communications, and more particularly, to encoding and decoding data over a multi-line parallel bus.

Background

High-speed interfaces are frequently used between circuits and components of mobile wireless devices and other complex apparatus. For example, certain devices may include processing, communications, storage and/or display devices that interact with one another through communications links. Some of these devices, including synchronous dynamic random access memory (SDRAM), may be capable of providing or consuming data and control information at processor clock rates. Other devices, such as display controllers, may require variable amounts of data at relatively low video refresh rates.

In system-on-chips (SoCs), various components are integrated on a single die. For example, a typical SoC in present mobile phones contains hundreds of components such as central and graphical processing units, memories, power management circuits, cellular and other wireless radios, etc. This integration of a large number of components onto a single silicon substrate results in smaller and lower-power processing units compared to traditional systems. All these components communicate with each other via metal wires known as interconnects or buses.

In non-SoC systems, components may also use interconnects or buses to communicate with each other. For example, a processor (e.g., central processing unit (CPU)) may communicate with a memory (e.g., DDR4 RAM) via an interconnect located on a printed circuit board (PCB).

Problems associated with these interconnects are transmission energy and delay. For a given technology, the width of the wire and the distance to the substrate remains fixed, and hence the capacitive coupling depends strongly on the distance between the wires. As the inter-wire spacing decreases, the coupling capacitance between adjacent wires increases, leading to increased crosstalk. This crosstalk between adjacent wires degrades the signal integrity and increases transmission energy and delay. Hence, the interconnects pose a major challenge to keep up with the demand for increasing data transfer rates. What is needed is a novel crosstalk avoidance scheme that improves signal integrity while decreasing transmission energy and delay.

SUMMARY

Embodiments disclosed herein provide systems, methods and apparatus for transmitting/receiving data bits over a multi-line parallel bus.

In an aspect of the disclosure, a method of transmitting data bits includes selecting, from a sequential series of data bits, a plurality of data bits for transmission over a plurality of parallel bus lines; and for each bus line of the plurality of parallel bus lines: comparing a state of a current data bit selected for transmission on a current bus line during a current clock cycle with one or more conditions related to the current bus line or at least one bus line adjacent to the current bus line, wherein the one or more conditions includes a state of two data bits respectively transmitted on two bus lines adjacent to the current bus line during a previous clock cycle, and determining whether to transmit the current data bit on the current bus line based on the comparison.

The comparing and the determining operations may be performed for all bus lines of the plurality of bus lines during one clock cycle. Additionally and/or alternatively, the comparing and the determining operations may be performed for each bus line of the plurality of bus lines in a sequential manner. The one or more conditions may further include a state of a previous data bit transmitted on the current bus line during the previous clock cycle, or a state of at least one data bit respectively transmitted on the at least one bus line adjacent to the current bus line during the current clock cycle.

In an aspect, the method may further comprise, for each bus line, encoding the current data bit if the current data bit is determined to be transmitted on the current bus line based on the comparison, and transmitting the encoded data bit via the current bus line. In another aspect, the method may further comprise, for each bus line, transmitting a filler bit via the current bus line if the current data bit is determined not to be transmitted on the current bus line based on the comparison. In a further aspect, the method may further comprise, for each bus line, shifting the current data bit onto a subsequent bus line for transmission if the current data bit is determined not to be transmitted on the current bus line.

In an aspect of the disclosure, an apparatus for transmitting data bits includes a memory and a processing circuit coupled to the memory. The processing circuit is configured to select, from a sequential series of data bits, a plurality of data bits for transmission over a plurality of parallel bus lines, and for each bus line of the plurality of parallel bus lines: compare a state of a current data bit selected for transmission on a current bus line during a current clock cycle with one or more conditions related to the current bus line or at least one bus line adjacent to the current bus line, wherein the one or more conditions includes a state of two data bits respectively transmitted on two bus lines adjacent to the current bus line during a previous clock cycle, and determine whether to transmit the current data bit on the current bus line based on the comparison.

In an aspect, for each bus line, the processing circuit is further configured to encode the current data bit if the current data bit is determined to be transmitted on the current bus line based on the comparison, and transmit the encoded data bit via the current bus line. In another aspect, for each bus line, the processing circuit is further configured to transmit a filler bit via the current bus line if the current data bit is determined not to be transmitted on the current bus line based on the comparison. In a further aspect, for each bus line, the processing circuit is further configured to shift the current data bit onto a subsequent bus line for transmission if the current data bit is determined not to be transmitted on the current bus line.

In an aspect of the disclosure, an apparatus for transmitting data bits includes means for selecting, from a sequential series of data bits, a plurality of data bits for transmission over a plurality of parallel bus lines, and for each bus line of the plurality of parallel bus lines: means for comparing a state of a current data bit selected for transmission on a current bus line during a current clock cycle with one or more conditions related to the current bus line or at least one bus line adjacent to the current bus line, wherein the one or more conditions includes a state of two data bits respectively transmitted on two bus lines adjacent to the current bus line during a previous clock cycle, and means for determining whether to transmit the current data bit on the current bus line based on the comparison.

In an aspect, for each bus line, the apparatus further comprises means for encoding the current data bit if the current data bit is determined to be transmitted on the current bus line based on the comparison, and means for transmitting the encoded data bit via the current bus line. In another aspect, for each bus line, the apparatus further comprises means for transmitting a filler bit via the current bus line if the current data bit is determined not to be transmitted on the current bus line based on the comparison. In a further aspect, for each bus line, the apparatus further comprises means for shifting the current data bit onto a subsequent bus line for transmission if the current data bit is determined not to be transmitted on the current bus line.

In an aspect of the disclosure, a processor-readable storage medium having one or more instructions which, when executed by a processing circuit, cause the processing circuit to select, from a sequential series of data bits, a plurality of data bits for transmission over a plurality of parallel bus lines, and for each bus line of the plurality of parallel bus lines: compare a state of a current data bit selected for transmission on a current bus line during a current clock cycle with one or more conditions related to the current bus line or at least one bus line adjacent to the current bus line, wherein the one or more conditions includes a state of two data bits respectively transmitted on two bus lines adjacent to the current bus line during a previous clock cycle, and determine whether to transmit the current data bit on the current bus line based on the comparison.

In an aspect, for each bus line, the one or more instructions further cause the processing circuit to encode the current data bit if the current data bit is determined to be transmitted on the current bus line based on the comparison, and transmit the encoded data bit via the current bus line. In another aspect, for each bus line, the one or more instructions further cause the processing circuit to transmit a filler bit via the current bus line if the current data bit is determined not to be transmitted on the current bus line based on the comparison. In a further aspect, for each bus line, the one or more instructions further cause the processing circuit to shift the current data bit onto a subsequent bus line for transmission if the current data bit is determined not to be transmitted on the current bus line.

In an aspect of the disclosure, a method of receiving data bits includes receiving a plurality of data bits over a plurality of parallel bus lines; and for each bus line of the plurality of parallel bus lines: comparing a state of a current data bit received on a current bus line during a current clock cycle with one or more conditions related to the current bus line or at least one bus line adjacent to the current bus line, wherein the one or more conditions includes a state of two data bits respectively received on two bus lines adjacent to the current bus line during a previous clock cycle, and determining whether to decode the current data bit on the current bus line based on the comparison.

The comparing and the determining operations may be performed for all bus lines of the plurality of bus lines during one clock cycle. Additionally and/or alternatively, the comparing and the determining operations may be performed for each bus line of the plurality of bus lines in a sequential manner. The one or more conditions may further include a state of a previous data bit received on the current bus line during the previous clock cycle, or a state of at least one data bit respectively received on the at least one bus line adjacent to the current bus line during the current clock cycle.

In an aspect, the method may further comprise, for each bus line, decoding the current data bit if the current data bit is determined to be decoded based on the comparison, and discarding the current data bit if the current data bit is determined not to be decoded based on the comparison. The current data bit determined not to be decoded may be a filler bit. In another aspect, the method may further comprise recovering a sequential series of data bits based on a plurality of current data bits decoded from the plurality of parallel bus lines.

In an aspect of the disclosure, an apparatus for receiving data bits includes a memory and a processing circuit coupled to the memory. The processing circuit is configured to receive a plurality of data bits over a plurality of parallel bus lines, and for each bus line of the plurality of parallel bus lines: compare a state of a current data bit received on a current bus line during a current clock cycle with one or more conditions related to the current bus line or at least one bus line adjacent to the current bus line, wherein the one or more conditions includes a state of two data bits respectively received on two bus lines adjacent to the current bus line during a previous clock cycle, and determine whether to decode the current data bit on the current bus line based on the comparison.

In an aspect, for each bus line, the processing circuit is further configured to decode the current data bit if the current data bit is determined to be decoded based on the comparison, and discard the current data bit if the current data bit is determined not to be decoded based on the comparison. In another aspect, the processing circuit is further configured to recover a sequential series of data bits based on a plurality of current data bits decoded from the plurality of parallel bus lines.

In an aspect of the disclosure, an apparatus for receiving data bits includes means for receiving a plurality of data bits over a plurality of parallel bus lines, and for each bus line of the plurality of parallel bus lines: means for comparing a state of a current data bit received on a current bus line during a current clock cycle with one or more conditions related to the current bus line or at least one bus line adjacent to the current bus line, wherein the one or more conditions includes a state of two data bits respectively received on two bus lines adjacent to the current bus line during a previous clock cycle, and means for determining whether to decode the current data bit on the current bus line based on the comparison.

In an aspect, for each bus line, the apparatus further includes means for decoding the current data bit if the current data bit is determined to be decoded based on the comparison, and means for discarding the current data bit if the current data bit is determined not to be decoded based on the comparison. In another aspect, the apparatus further includes means for recovering a sequential series of data bits based on a plurality of current data bits decoded from the plurality of parallel bus lines.

In an aspect of the disclosure, a processor-readable storage medium having one or more instructions which, when executed by a processing circuit, cause the processing circuit to receive a plurality of data bits over a plurality of parallel bus lines, and for each bus line of the plurality of parallel bus lines: compare a state of a current data bit received on a current bus line during a current clock cycle with one or more conditions related to the current bus line or at least one bus line adjacent to the current bus line, wherein the one or more conditions includes a state of two data bits respectively received on two bus lines adjacent to the current bus line during a previous clock cycle, and determine whether to decode the current data bit on the current bus line based on the comparison.

In an aspect, for each bus line, the one or more instructions further cause the processing circuit to decode the current data bit if the current data bit is determined to be decoded based on the comparison, and discard the current data bit if the current data bit is determined not to be decoded based on the comparison. In another aspect, the one or more instructions further cause the processing circuit to recover a sequential series of data bits based on a plurality of current data bits decoded from the plurality of parallel bus lines.

DETAILED DESCRIPTION

Figure 1:
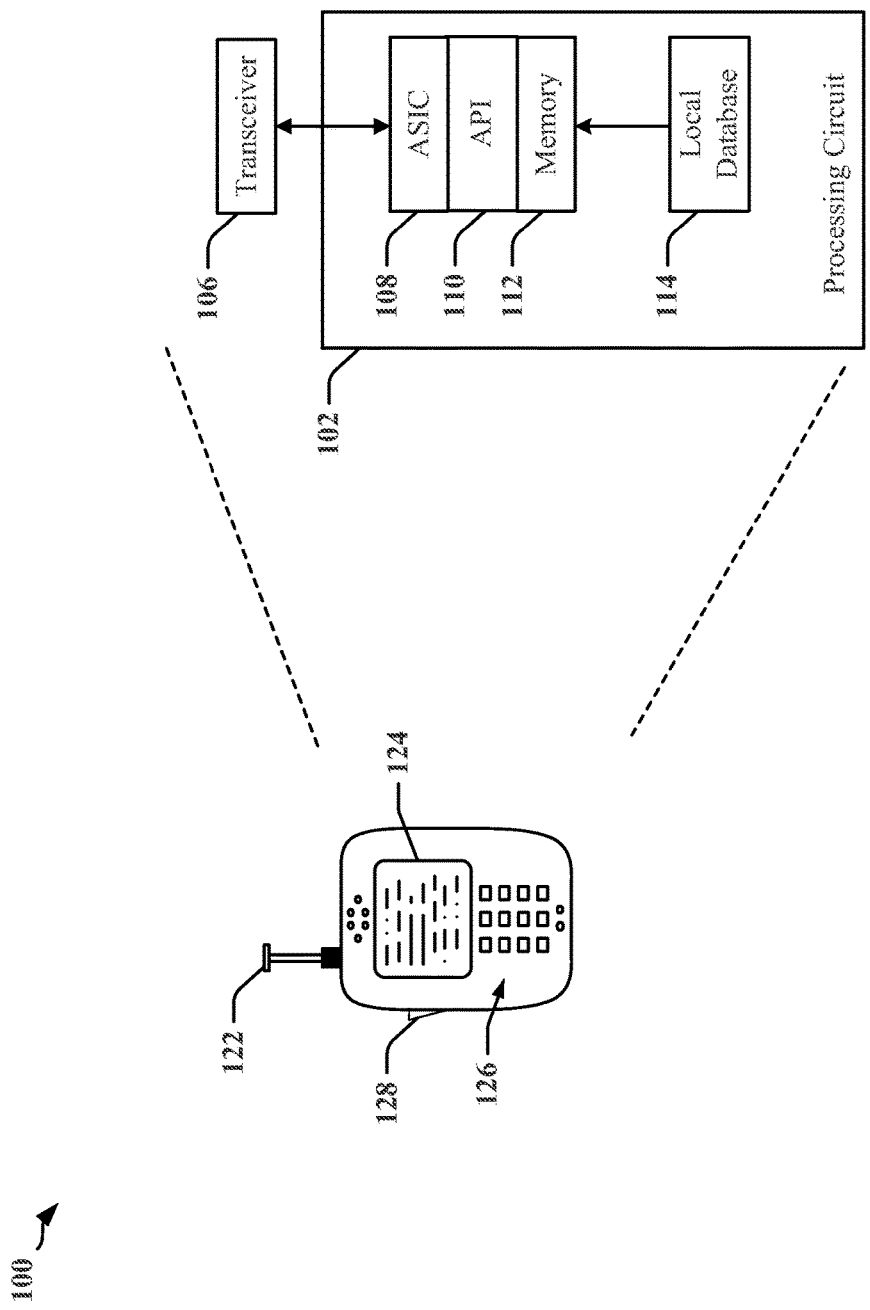
FIG. 1 depicts an apparatus that employs an encoded data link between devices within the apparatus.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Overview

Various solutions for combatting crosstalk have previously been provided. For example, one previous solution is to insert one or more ground wires between every pair of lines. This shields a wire from its immediate neighbors thereby eliminating crosstalk. However, this solution increases the number of required wires, or, put differently, reduces the number of bits that can be transmitted per wire in each clock cycle. To achieve an up to a factor 2 reduction in transmission energy and delay, a single ground wire may be used for shielding, so that for a bus with N wires, this approach transmits 0.5N bits per clock cycle over the bus. For a up to factor 4 reduction in transmission energy and delay, two ground wires may be used for shielding, so that for a bus with N wires, this approach transmits 0.33N bits per clock cycle over the bus. Thus, a tradeoff exists between the bus transfer rate and the bus transmission energy and delay when using the wire shielding solution described above.

Other solutions for combatting crosstalk include the use of crosstalk-avoidance codes as an alternative to shielding to combat the undesirable effects of capacitive coupling. However, the focus of previous schemes using crosstalk-avoidance codes has been to achieve up to a factor 2 transmission energy and delay reduction (the same as the single-wire shielding solution described above). For example, crosstalk-avoidance codes may be used to reduce a worst-case transmission delay by avoiding certain transitions on adjacent wires. In another example, a run-length code may be implemented to decrease a worst-case coupling capacitance thereby reducing the energy consumption and delay of the bus by half. For a bus with N wires, the run-length code transmits approximately 0.69N bits per clock cycle over the bus. In a further example, a bit-stuffing encoder may be provided to achieve a higher rate of approximately 0.83N bits per clock cycle over the bus. Thus, previous approaches using crosstalk avoidance codes achieve the same transmission energy and delay benefits of up to a factor 2 as single-wire shielding while increasing the bus transfer rate from 0.5N to 0.83N for an N-wire bus.

Accordingly, what is needed is a novel crosstalk avoidance code achieving an up to a factor 4 reduction in transmission energy and delay (same as double-wire shielding solution described above). The present disclosure provides such a code using a look-ahead encoder and decoder that is implementable with simple combinational circuits. The present disclosure achieves a bus transfer rate of approximately 0.5 1N bits per clock cycle over an N-wire bus. Comparing this to the double-wire shielding solution with the same transmission energy and delay benefits, the code of the present disclosure achieves a more that 50% increase in rate. Moreover, the code of the present disclosure achieves a slightly larger rate than the single-wire shielding solution while further reducing the propagation energy and delay by an additional factor of up to 2.

Exemplary Operating Environment

Certain disclosed examples relate to systems and apparatus for transmitting/receiving data bits over a plurality of conductors (i.e., N conductors or wires). The N conductors may include three or more conductors, and each conductor may be referred to as a wire, although the N conductors may include conductive traces on a circuit board or within a conductive layer of a semiconductor integrated circuit (IC) device. The N conductors may be divided into a plurality of transmission groups, each group encoding a portion of a block of data to be transmitted.

Certain aspects of the disclosure may be applicable to communications links deployed between electronic components, which may include subcomponents of devices such as telephones, mobile computing devices, appliances, automobile electronics, avionics systems, etc. Referring to FIG. 1, for example, an apparatus 100 employing N-wire encoding/decoding may include a processing circuit 102 that is configured to control operation of the apparatus 100. The processing circuit 102 may access and execute software applications and control logic circuits and other devices within the apparatus 100. In one example, the apparatus 100 may include a wireless communication device that communicates through a radio frequency (RF) communications transceiver 106 with a radio access network (RAN), a core access network, the Internet and/or another network. The communications transceiver 106 may be operably coupled to a processing circuit 102. The processing circuit 102 may include one or more IC devices, such as an application specific integrated circuit (ASIC) 108. The ASIC 108 may include one or more processing devices, logic circuits, and so on. The processing circuit 102 may include and/or be coupled to processor readable storage 112 that may maintain instructions and data that may be executed by the processing circuit 102. The processing circuit 102 may be controlled by one or more of an operating system and an application programming interface (API) 110 layer that supports and enables execution of software modules residing in the storage 112 of the wireless device. The storage 112 may include read only memory (ROM) or random access memory (RAM), electrically erasable programmable read only memory (EEPROM), a flash memory device, or any memory device that can be used in processing systems and computing platforms. The processing circuit 102 may include and/or access a local database 114 that can maintain operational parameters and other information used to configure and operate the apparatus 100. The local database 114 may be implemented using one or more of a database module or server, flash memory, magnetic media, EEPROM, optical media, tape, soft or hard disk, or the like. The processing circuit may also be operably coupled to external devices such as an antenna 122, a display 124, operator controls, such as a button 128 and a keypad 126, among other components.

Figure 2:
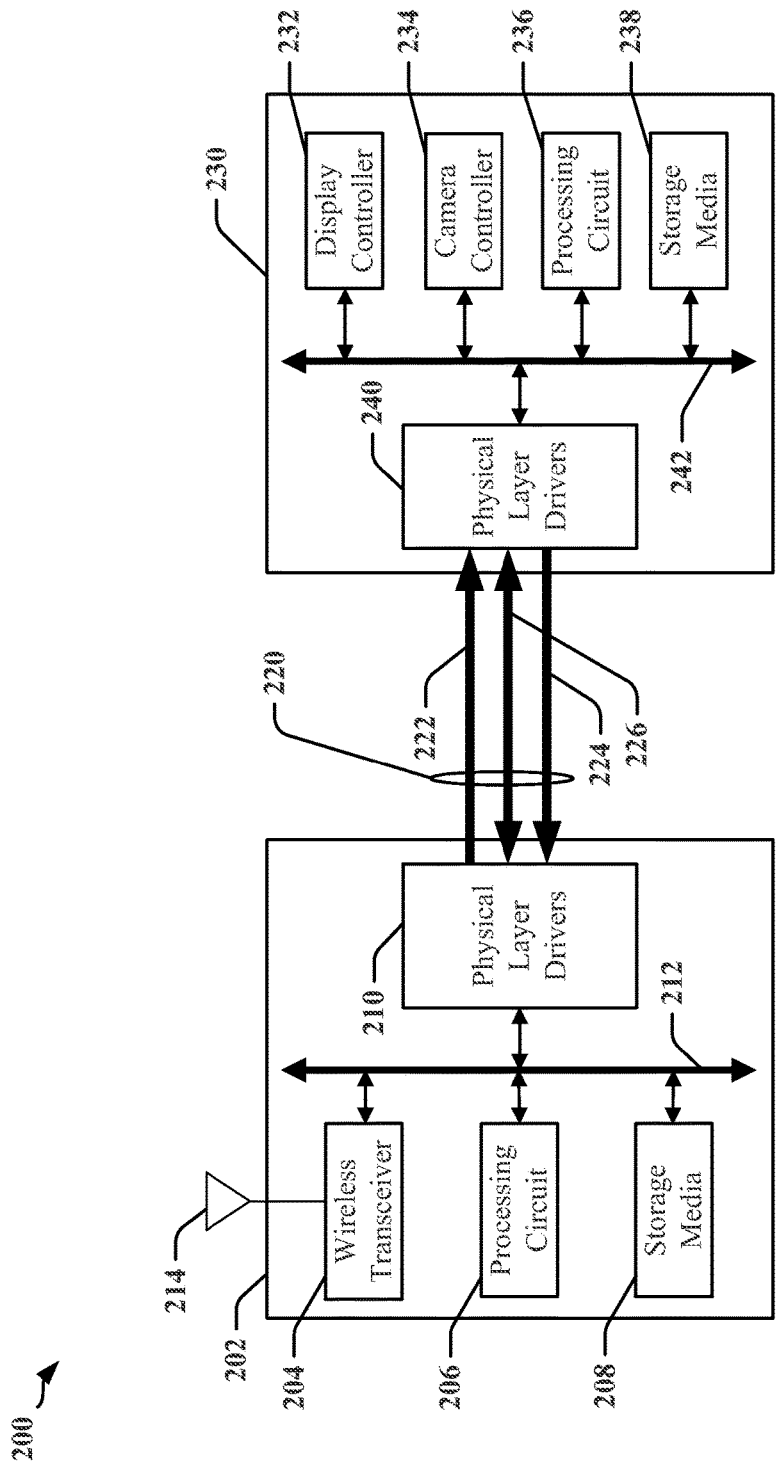
FIG. 2 illustrates a system architecture for an apparatus employing an encoded data link.

FIG. 2 is a block schematic illustrating certain aspects of an apparatus 200 such as a wireless mobile device, a mobile telephone, a mobile computing system, a wireless telephone, a notebook computer, a tablet computing device, a media player, a gaming device, or the like. The apparatus 200 may include a plurality of IC devices 202 and 230 that exchange data and control information through a communications link 220. The communications link 220 may be used to connect the IC devices 202 and 230, which may be located in close proximity to one another or physically located in different parts of the apparatus 200. In one example, the communications link 220 may be provided on a chip carrier, substrate or circuit board that carries the IC devices 202 and 230. In another example, a first IC device 202 may be located in a keypad section of a flip-phone while a second IC device 230 may be located in a display section of the flip-phone. A portion of the communications link 220 may include a cable or an optical connection.

The communications link 220 may include multiple channels 222, 224 and 226. One or more channel 226 may be bidirectional, and may operate in half-duplex mode and/or full-duplex mode. One or more channels 222, 224 may be unidirectional. The communications link 220 may be asymmetrical, providing higher bandwidth in one direction. In one example described herein, a first communications channel 222 may be referred to as a forward link 222 while a second communications channel 224 may be referred to as a reverse link 224. The first IC device 202 may be designated as a host, master and/or transmitter, while the second IC device 230 may be designated as a client, slave and/or receiver, even if both IC devices 202 and 230 are configured to transmit and receive on the communications link 220. In one example, the forward link 222 may operate at a higher data rate when communicating data from a first IC device 202 to a second IC device 230, while the reverse link 224 may operate at a lower data rate when communicating data from the second IC device 230 to the first IC device 202.

The IC devices 202 and 230 may each include a processor or other processing and/or computing circuit or device 206, 236. In one example, the first IC device 202 may perform core functions of the apparatus 200, including maintaining wireless communications through a wireless transceiver 204 and an antenna 214, while the second IC device 230 may support a user interface that manages or operates a display controller 232, and may control operations of a camera or video input device using a camera controller 234. Other features supported by one or more of the IC devices 202 and 230 may include a keyboard, a voice-recognition component, and other input or output devices. The display controller 232 may include circuits and software drivers that support a display such as a liquid crystal display (LCD) panel, a touch-screen display, an indicator, and so on. The storage media 208 and 238 may include transitory and/or non-transitory storage devices adapted to maintain instructions and data used by the respective processing circuits 206 and 236, and/or other components of the IC devices 202 and 230. Communication between each processing circuit 206, 236 and its corresponding storage media 208 and 238 and other modules and circuits may be facilitated by one or more buses 212 and 242, respectively.

The reverse link 224 may be operated in the same manner as the forward link 222. The forward link 222 and the reverse link 224 may be capable of transmitting at comparable speeds or at different speeds, where speed may be expressed as a data transfer rate and/or a clocking rate. The forward and reverse data rates may be substantially the same or may differ by orders of magnitude, depending on the application. In some applications a single bidirectional link 226 may support communications between the first IC device 202 and the second IC device 230. The forward link 222 and/or the reverse link 224 may be configurable to operate in a bidirectional mode when, for example, the forward and reverse links 222 and 224 share the same physical connections and operate in a half-duplex manner.

In certain examples, the reverse link 224 derives a clocking signal from the forward link 222 for synchronization purposes, for control purposes, to facilitate power management and/or for simplicity of design. The clocking signal may have a frequency that is obtained by dividing the frequency of a symbol clock used to transmit signals on the forward link 222. The symbol clock may be superimposed or otherwise encoded in symbols transmitted on the forward link 222. The use of a clocking signal that is a derivative of the symbol clock allows fast synchronization of transmitters and receivers (transceivers 210, 240) and enables fast start and stop of data signals without the need for framing to enable training and synchronization.

In certain examples, a single bidirectional link 226 may support communications between the first IC device 202 and the second IC device 230. In some instances, the first IC device 202 and the second IC device 230 provide encoding and decoding of data, address and control signals transmitted between a processing device and memory devices such as dynamic random access memory (DRAM).

Exemplary Description

Due to decreasing transistor sizes, interconnect wires (buses) are emerging as a performance bottleneck in system-on-chips (SoCs)/chip-to-chip communications. Bus transmission energy and delay is affected by capacitive coupling between neighboring wires. Thus, as technology scaling increases bus interline capacitive coupling, transmission energy and delay are adversely affected. If the ratio of the bus interline capacitance to the bulk capacitance is λ, then a worst-case transmission energy and delay for an N-wire bus is proportional to 1+4λ. Shielding wires can mitigate crosstalk at the expense of reducing a data rate. For example, delay may be reduced by introducing grounded wires (shielding) in between adjacent data lines. By placing two grounded wires between adjacent data lines (double-wire shielding), the worst-case delay can be reduced to 1+λ. However, the data transfer rate is consequently reduced to 0.33N bits per clock cycle over an N-wire bus.

Crosstalk-avoidance coding is an alternative to shielding. Here, the worst-case transmission energy and delay may be reduced by using coding to prevent certain transitions on adjacent wires. Accordingly, the present disclosure provides a novel look-ahead crosstalk avoidance code to achieve a transmission energy and delay reduction of up to a factor 4. In an aspect, the bus is encoded based on data previously transmitted over the bus (hereinafter referred to as "past bus state") to ensure that certain transitions are avoided. The crosstalk avoidance code achieves a bus transfer rate of approximately 0.51 N bits per clock cycle over an N-wire bus and may be encoded and decoded with a simple combinational circuit, thus facilitating negligible delay and energy dissipation in the codec. The length of a critical path in both an encoder and decoder circuit of the present disclosure is of order N (i.e., linear with the bus size), thus making it easily implementable. This amounts to an increase of more than 50% in bus transfer rate compared to simple wire shielding (0.33N bits per clock cycle) with the same transmission energy and delay benefits.

In an interconnect bus, an established model for bus lines in deep sub-micron/very deep sub-micron (DSM/vDSM) technology is that the bus lines have their individual resistance and capacitance, and that the bus lines are further capacitively coupled with each other. Various inductances in the model can be ignored by assuming that the voltages along the bus lines have reached their final value before they are sampled at the end of a clock period. Let N be the number of lines in the bus, E be the total energy dissipated, and $d=(d_1, \ldots, d_N)^T$ be the vector of delays across each line. Accordingly:

$$E = \frac{1}{2}V_{DD}(v^+ - v^-)^T C(v^+ - v^-),$$

$$d = V_{DD} \operatorname{diag}(v^+ - v^-) RC(v^+ - v^-), \text{ where}$$

$$v^- = (v_1^-, \ldots, v_N^-)^T \text{ and } v^+ = (v_1^+, \ldots, v_N^+)^T$$

denote the normalized (by $V_{DD}$) binary initial and final voltages, each taking values in {0, 1} depending on the transmitted data in the previous and current clock cycle, respectively.

Here, C denotes the tridiagonal capacitance matrix:

$$C \triangleq \begin{pmatrix} 1+\lambda & -\lambda & 0 & \ldots & 0 \\ -\lambda & 1+2\lambda & -\lambda & \ldots & 0 \\ 0 & -\lambda & \ddots & \ddots & 0 \\ \vdots & \vdots & \ddots & 1+2\lambda & -\lambda \\ 0 & 0 & \ldots & -\lambda & 1+\lambda \end{pmatrix} C_B,$$

assuming that a wire has significant capacitive-coupling to only the two nearest neighboring wires, and where λ is the ratio of the interline capacitance to the bulk capacitance (sum of parasitic, driver, and load capacitances to ground) denoted by $C_B$. The interline capacitance is equal for all wires and is inversely proportional to the interline spacing. Hence, as the spacing decreases, the interline capacitance increases. $C_B$ is the sum of the driver, load, and parasitic capacitances of each line to the ground. R denotes the diagonal matrix of resistances, and each diagonal entry corresponds to the sum of the driver, load, and line resistances. The parameter A can be as large as 6.

The coupling capacitance makes the energy and delay dependent on the initial and final voltages and hence is dependent on the data transition. From the above expressions, it can be seen that reducing delay also reduces the dissipated energy. Accordingly, the delay term will be the focus from here on.

The normalized (with respect to $C_B$ and $V_{DD}$) delay expression can be written more explicitly as $$d_n(v^-,v^+)=|\Delta_n|+\lambda|2\Delta_n-\Delta_{n-1}-\Delta_{n+1}|$$

for 1<n<N, and where $$\Delta_n \triangleq (v_n^+ - v_n^-) \in \{-1,0,1\}$$

is the change of the binary voltage on the nth bus line. The possible values for the delay $d_n$ of line n are 0, 1, 1+λ, 1+2λ, 1+3λ, and 1+4λ corresponding to different values of $\Delta_{n-1}$, $\Delta_n$, $\Delta_{n+1}$. Similar expressions can be derived for n=1 and n=N; since the bulk delay is due to the lines in the middle, they are not explicitly stated here.

The delay of the N-wire bus is the maximum delay $$\max_{v^-,v^+} \max_n d_n(v^-, v^+)$$

of all the lines in the bus for the worst-case transition. To ensure that the system stays synchronized, the worst-case delay has to be less than one clock cycle. Without further restrictions, the worst-case delay is 1+4λ. As λ increases due to decreasing interline spacing, the worst-case delay increases as well.

To reduce the worst-case delay, certain transitions from $v^-$ to $v^+$ may be prohibited. For r∈{1, 2, 3, 4}, the delay class $M_r$ may be defined to be the set of all bit transitions on the N-wire bus that result in a delay less than or equal to 1+rλ. By constraining the bus to only carry transitions in $M_r$ with r<4, the maximal bus delay is reduced from 1+4λ to 1+rλ. The bus transmission delay (and, as discussed earlier, also the bus transmission energy) is thereby reduced by a factor (1+4λ)/(1+rλ). For large values of λ, this ratio is close to 4/r.

The single-wire shielding approach and the crosstalk avoidance codes discussed above have transitions in $M_2$, resulting in transmission energy and delay reductions up to a factor 2. The double-wire shielding approach has transitions in $M_1$, resulting in transmission energy and delay reductions up to a factor 4. From the expression for $d_n$, it can be seen that placing two grounded wires between two data lines still incurs a delay of more than 1+λ because of the coupling of a data line to adjacent grounded lines. One way to ensure that all transitions are in $M_1$ is to transmit the same information over the wire immediately to the right of a data line followed by a grounded wire. This may be known as duplicating and shielding.

The present disclosure relates to providing crosstalk-avoidance codes with transitions restricted to the transition class $M_1$, but with transfer rates higher than the 0.33N rate of double-wire shielding. In an aspect, the cross-talk avoidance codes of the present disclosure may be applied to communications between SoC components and/or communications involving non-SoC components such as a processor (e.g., CPU) and a memory (e.g., DDR4 RAM), wherein interconnects/bus lines/wires between the processor and the memory may be located on a printed circuit board (PCB).

As mentioned above, the bus transmission energy and delay is affected by capacitive coupling between neighboring wires. If the ratio of the bus interline capacitance to the bulk capacitance is $\lambda$, then the worst-case transmission energy and delay for an N-wire bus is proportional to $1+4\lambda$. A simple way to reduce this delay is to introduce grounded wires (shielding) in between adjacent data lines. By placing two grounded wires between adjacent data lines (double-wire shielding), the worst-case delay can be reduced to $1+\lambda$. However, the data transfer rate is also now reduced to 0.33N bits per clock cycle over an N-wire bus. Another way to reduce the worst-case transmission energy and delay is to use coding (e.g., cross-talk avoidance coding) to prevent certain transitions on adjacent wires. The present disclosure provides a novel crosstalk-avoidance code that limits the worst-case transmission energy and delay to $1+\lambda$.

Figure 3:
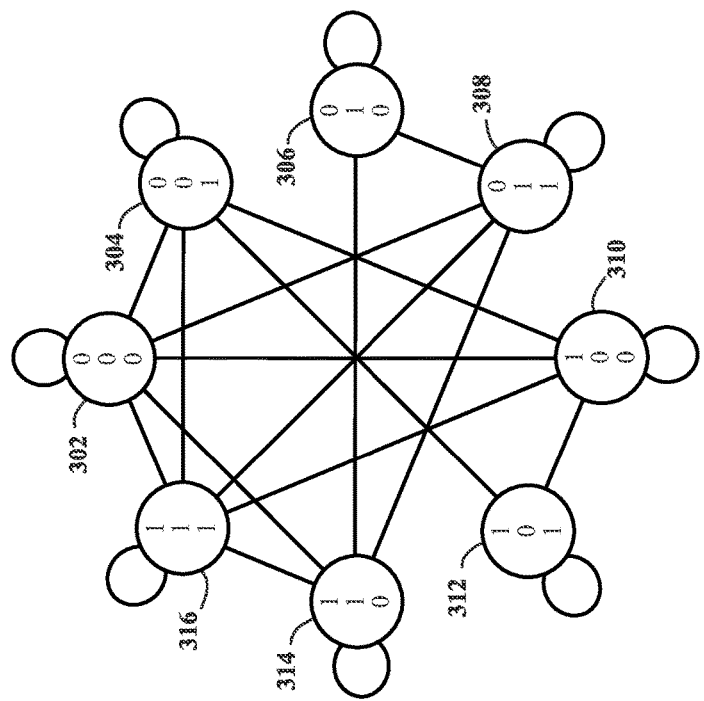
FIG. 3 is a state transition graph for a transition class $M_1$ illustrating 8 states in an example of a 3-wire link.

FIG. 3 is a state transition graph 300 for the transition class $M_1$ illustrating 8 states of 3 consecutive bus lines. For example, states 302, 304, 306, 308, 310, 312, 314, and 316 are depicted, wherein each of the states 302, 304, 306, 308, 310, 312, 314, and 316 represents a state of 3 consecutive bus lines. In FIG. 3, all edges are non-directional. However, the state transition graph 300 is not complete, that is, some edges are missing. The missing edges may correspond to transitions with normalized delay of $2\lambda$, $1+2\lambda$, $1+3\lambda$, or $1+4\lambda$.

In an aspect, consider a bus with N=3 (i.e., 3 bus lines). To operate in $M_1$, out of a total of 27 possible transitions from $v^-$ to $v^+$, the following 14 transitions should be avoided on any three consecutive data lines:

$$\begin{pmatrix}\uparrow\\\downarrow\\\uparrow\end{pmatrix},\begin{pmatrix}\downarrow\\\uparrow\\\downarrow\end{pmatrix},\begin{pmatrix}-\\\downarrow\\\uparrow\end{pmatrix},\begin{pmatrix}-\\\uparrow\\\uparrow\end{pmatrix},\begin{pmatrix}\uparrow\\\downarrow\\-\end{pmatrix},\begin{pmatrix}\downarrow\\\uparrow\\-\end{pmatrix},\begin{pmatrix}-\\\uparrow\\-\end{pmatrix},$$

$$\begin{pmatrix}-\\\downarrow\\-\end{pmatrix},\begin{pmatrix}\uparrow\\\uparrow\\\downarrow\end{pmatrix},\begin{pmatrix}\downarrow\\\uparrow\\\uparrow\end{pmatrix},\begin{pmatrix}\uparrow\\\downarrow\\\uparrow\end{pmatrix},\begin{pmatrix}\downarrow\\\downarrow\\\uparrow\end{pmatrix},\begin{pmatrix}\uparrow\\-\\-\end{pmatrix},\begin{pmatrix}\downarrow\\-\\-\end{pmatrix},$$

where each line can either stay stationery (−), transit up (↑), or transit down (↓). In more detail, "↑" denotes a transition from 0 to 1, "↓" denotes a transition from 1 to 0, and "−" denotes a stationery transition. The 14 transitions noted above may be referred to as "forbidden transitions." In an aspect, the present disclosure provides for an encoder/decoder that performs a single "look-ahead" to ensure that setting a data line at a present time will not create forbidden transition states in the future, which may lead to the encoder being "stuck," as will be discussed below. This results in the state transition graph 300 of FIG. 3, in which each node corresponds to a vector v, and two nodes $v^-$ and $v^+$ are connected by an edge if the transition from $v^-$ and $v^+$ is in $M_1$. The set $M_1$ is symmetric in the pair $(v^-, v^+)$ and hence the corresponding state transition graph 300 is non-directional. Notably, avoiding only the first 6 transitions shown above results in $M_2$. In a first example (Example 1), let N=3, and let $v^-=(0, 1, 0)^T$. Accordingly, from the state transition graph 300 of FIG. 3, the transition to $v^+=(1, 0, 0)^T$ is not allowed. That is, the transition from state 306 to state 310 in FIG. 3 is not allowed.

As an example, let N denote the bus size, and let $a=(a_1, a_2, \ldots, a_N)$ denote the past state of the bus. A next bus input $b=(b_1, b_2, \ldots, b_N)$ may be constructed one bit at a time, i.e., first $b_1$, then $b_2$ and so on. The bus input is constructed as a function of the information bits u, which are to be communicated over the bus. An encoder may map the information bits to a new bus input, taking the past bus state into account. This mapping is then reversed by a decoder at the output of the bus, thereby recovering the information bits. In an aspect, the mapping from the information bits to the bus input has a variable rate. Thus, the number of information bits transmitted over the bus is time-varying and depends on the past bus state. This may necessitate the use of transmitter and receiver buffers to smooth the variable rate into a constant rate as will be discussed in detail below.

In an aspect, using the state transition graph 300 of FIG. 3, a new $M_1$ crosstalk-avoidance code for a general N-wire bus may be constructed. Here, bus lines are assumed to be stacked vertically, and data is assumed to be transmitted from left to right. For ease of notation, a past binary bus state $v^-$ may be denoted by a, and a new binary bus state $v^+$ may be denoted by b. The past bus state a is assumed to be fixed and known. An information vector u may be transformed into a new bus input b respecting the transition restrictions imposed by $M_1$. The input b may be sequentially constructed from top to bottom.

In an aspect, suppose that a line number n>1 is to be filled. That is, all $b_i$, $1 \leq i \leq n-1$ have been set to either 0 or 1 and are consistent with a via the set $M_1$. The bit $b_n$ may then be chosen. This may be written as follows:

$$\begin{pmatrix}a_1\\\vdots\\a_{n-2}\\a_{n-1}\\a_n\end{pmatrix} \to \begin{pmatrix}b_1\\\vdots\\b_{n-2}\\b_{n-1}\\?\end{pmatrix}.$$

Referring to the state transition graph 300 of FIG. 3, in order to fill bit $b_n$, the bits $a_{n-2}, a_{n-1}, a_n$, and $b_{n-2}, b_{n-1}$ need to be taken into account. Indeed, $b_n$ has to be chosen such that the transition $$\begin{pmatrix}a_{n-2}\\a_{n-1}\\a_n\end{pmatrix} \to \begin{pmatrix}b_{n-2}\\b_{n-1}\\b_n\end{pmatrix}$$

is valid, i.e., an element of $M_1$. Defining the superstate $$\begin{pmatrix}a_{n-2} & b_{n-2}\\a_{n-1} & b_{n-1}\end{pmatrix},$$

this transition can be equivalently expressed as $$\begin{pmatrix}a_{n-2} & b_{n-2}\\a_{n-1} & b_{n-1}\end{pmatrix} \to \begin{pmatrix}a_{n-2} & b_{n-1}\\a_n & ?\end{pmatrix}.$$

The state transition graph 300 of FIG. 3 can be transformed into a state transition graph for these superstates. A transition from one superstate to another is allowed if and only if the corresponding transition is allowed in FIG. 3.

In an example of transitioning between superstates (Example 2), consider the superstate $$\begin{pmatrix} 0 & 0 \\ 1 & 1 \end{pmatrix},$$

i.e., $a_{n-2}=0$, $a_{n-1}=1$, $b_{n-2}=0$, $b_{n-1}=1$. As such, the superstate to which to transition must overlap in the sense that the first row of the end superstate must be equal to the last row of the starting superstate. Thus, the possible superstates to which to transition are as follows:

$$\begin{pmatrix} 1 & 1 \\ 0 & 0 \end{pmatrix}, \begin{pmatrix} 1 & 1 \\ 0 & 1 \end{pmatrix}, \begin{pmatrix} 1 & 1 \\ 1 & 0 \end{pmatrix}, \begin{pmatrix} 1 & 1 \\ 1 & 1 \end{pmatrix}.$$

Referring to FIG. 3, it can be confirmed that these superstates can be valid end superstates. For example, consider the second end superstate. This superstate transition is equivalent to the state transition $$\begin{pmatrix} a_{n-2} = 0 \\ a_{n-1} = 1 \\ a_n = 0 \end{pmatrix} \rightarrow \begin{pmatrix} b_{n-2} = 0 \\ b_{n-1} = 1 \\ b_n = 0 \end{pmatrix},$$

which can be concluded from FIG. 3 as a possible transition, and hence the superstate transition is allowed. In the above example, all four possible superstate transitions are allowed. Accordingly, the starting superstate may be considered to have "full transitions." In an aspect, not all possible state transitions are allowed. As a result, not all possible superstate transitions are allowed either.

In an example of partial transitioning between superstates (Example 3), consider the superstate $$\begin{pmatrix} 0 & 1 \\ 0 & 0 \end{pmatrix},$$

i.e., $a_{n-2}=0$, $a_{n-1}=0$, $b_{n-2}=1$, $b_{n-1}=0$. From the state transition graph 300 of FIG. 3, only the transition to the superstate $$\begin{pmatrix} 0 & 0 \\ 0 & 1 \end{pmatrix}$$

is prohibited. Accordingly, if $a_n=0$, then the only possible value for $b_n$ is 0. In other words, the nth bus line is forced to take the value of 0. In an aspect, it is easily verifiable that $$\begin{pmatrix} 0 & 1 \\ 0 & 0 \end{pmatrix}, \begin{pmatrix} 0 & 1 \\ 0 & 1 \end{pmatrix}, \begin{pmatrix} 0 & 1 \\ 1 & 1 \end{pmatrix}, \begin{pmatrix} 1 & 0 \\ 0 & 0 \end{pmatrix}, \begin{pmatrix} 1 & 0 \\ 1 & 0 \end{pmatrix}, \begin{pmatrix} 1 & 0 \\ 1 & 1 \end{pmatrix}$$

are all the superstates with partial transitions.

In an example of forbidden superstates (Example 4), consider the superstate $$\begin{pmatrix} 0 & 1 \\ 1 & 0 \end{pmatrix},$$

i.e., $a_{n-2}=0$, $a_{n-1}=1$, $b_{n-2}=1$, $b_{n-1}=0$ and $$\begin{pmatrix} 1 & 0 \\ 0 & 1 \end{pmatrix},$$

i.e. $a_{n-2}=1$, $a_{n-1}=0$, $b_{n-2}=0$, $b_{n-1}=1$. From FIG. 3, it may be concluded that these superstates do not even exist in the state transition graph 300. These superstates are isolated, i.e., they have no edges coming out of them. In fact, these superstates correspond to adjacent wires transitioning in opposite directions, which result in transitions outside of $M_1$, regardless of the end superstate.

In an example of superstates with single transitions (Example 5), consider the superstate $$\begin{pmatrix} 0 & 0 \\ 1 & 0 \end{pmatrix},$$

i.e., $a_{n-2}=0$, $a_{n-1}=1$, $b_{n-2}=0$, $b_{n-1}=0$. The only possible superstate to which to transition is $$\begin{pmatrix} 1 & 0 \\ 1 & 0 \end{pmatrix}.$$

In this example, there may be past and current partial bus states for which no transitions are possible. In other words, when sequentially constructing the bus input b, the encoder can become "stuck." For example, if $$\begin{pmatrix} a_{n-2} = 0 \\ a_{n-1} = 1 \\ a_n = 0 \end{pmatrix} \text{ and } \begin{pmatrix} b_{n-2} = 0 \\ b_{n-1} = 0 \end{pmatrix},$$

then setting $b_n$ to either 0 or 1 will lead to an invalid transition in the state transition graph 300 of FIG. 3. Consequently, the encoder would not be able to proceed with the construction of b. The code construction of the present disclosure avoids this situation by using a look-ahead encoding scheme, as will be discussed below.

In an aspect, an encoder of the present disclosure removes forbidden superstates and avoids getting stuck in superstates with a single transition by using a single look-ahead. All four superstates with a single transition are shown below along with their only valid transition, $$\begin{pmatrix} 0 & 0 \\ 0 & 1 \end{pmatrix} \rightarrow \begin{pmatrix} 0 & 1 \\ 0 & 1 \end{pmatrix}, \begin{pmatrix} 0 & 0 \\ 1 & 0 \end{pmatrix} \rightarrow \begin{pmatrix} 1 & 0 \\ 1 & 0 \end{pmatrix},$$

$$\begin{pmatrix} 1 & 1 \\ 0 & 1 \end{pmatrix} \rightarrow \begin{pmatrix} 0 & 1 \\ 0 & 1 \end{pmatrix}, \begin{pmatrix} 1 & 1 \\ 1 & 0 \end{pmatrix} \rightarrow \begin{pmatrix} 1 & 0 \\ 1 & 0 \end{pmatrix}.$$

In an example of avoiding single transition superstates (Example 6), consider the superstate $$\begin{pmatrix} 0 & 0 \\ 0 & 0 \end{pmatrix},$$

i.e., $a_{n-2}=0$, $a_{n-1}=0$, $b_{n-2}=0$, $b_{n-1}=0$. From the state transition graph 300 of FIG. 3, it may be observed that this superstate has full transitions. In particular, the transitions $$\begin{pmatrix} a_{n-2}=0 \\ a_{n-1}=0 \\ a_n=0 \end{pmatrix} \rightarrow \begin{pmatrix} b_{n-2}=0 \\ b_{n-1}=0 \\ b_n=0 \end{pmatrix} \text{ and } \begin{pmatrix} a_{n-2}=0 \\ a_{n-1}=0 \\ a_n=0 \end{pmatrix} \rightarrow \begin{pmatrix} b_{n-2}=0 \\ b_{n-1}=0 \\ b_n=1 \end{pmatrix}$$

are both valid, so that both possible values of b are feasible. However, it may be observed that the second transition yields the superstate $$\begin{pmatrix} 0 & 0 \\ 0 & 1 \end{pmatrix}.$$

If $a_{n+1}=1$, then the next step of the encoder would yield the following transition $$\begin{pmatrix} 0 & 0 \\ 0 & 1 \end{pmatrix} \rightarrow \begin{pmatrix} 0 & 1 \\ 1 & ? \end{pmatrix}.$$

It may then be concluded that this transition, irrespective of the value of $b_{n+1}$, is prohibited. Hence, even if it first seemed that the encoder was free to choose $b_n$ to carry an information bit, the encoder would eventually become stuck depending on the value of $a_{n+1}$.

To ensure that the encoder does not become stuck, the encoder should look-ahead when filling the nth line. That is, the value of $b_n$ may depend on $a_{n+1}$ whenever there is a possibility of setting $$\begin{pmatrix} a_{n-1} & b_{n-1} \\ a_n & b_n \end{pmatrix}$$

to a superstate with a single transition.

In an example of look-ahead encoding (Example 7), the start superstate $$\begin{pmatrix} 0 & 0 \\ 0 & 0 \end{pmatrix}$$

from Example 6 above may again be considered, wherein the transition to the superstate $$\begin{pmatrix} 0 & 0 \\ 0 & 1 \end{pmatrix}$$

is valid and hence $b_n$ can be set to 1, but the encoder will become stuck if $a_{n+1}=1$. To avoid the encoder being stuck, the value of $a_{n+1}$ may be taken into account when deciding on the value for $b_n$. When $a_{n+1}=1$, $b_n$ may be forced to be 0. Thus, $$\begin{pmatrix} a_{n-2}=0 & b_{n-2}=0 \\ a_{n-1}=0 & b_{n-1}=0 \\ a_n=0 \\ a_{n+1}=1 \end{pmatrix},$$

implies $b_n=0$. On the other hand, if $$\begin{pmatrix} a_{n-2}=0 & b_{n-2}=0 \\ a_{n-1}=0 & b_{n-1}=0 \\ a_n=0 \\ a_{n+1}=1 \end{pmatrix},$$

then $b_n$ can be set to either 0 or 1, and therefore, line n is allowed to carry an information bit.

If $b_n$ is set to 1, the resulting superstate is $$\begin{pmatrix} a_{n-1}=0 & b_{n-1}=0 \\ a_n=0 & b_n=1 \end{pmatrix},$$

which has a single transition. Nevertheless, the encoder will not be stuck since $a_{n+1}$ is guaranteed to have the value of 1.

In an aspect, by combining forcing conditions as shown in the above examples (e.g., Examples 3, 4, and 7), an encoding scheme may be derived given the past state a and given a vector of information bits u. The encoder keeps a pointer k to the current information bit to be transmitted. The output of the encoder is b, the vector of inputs to the bus, which is constructed sequentially from n=1 to n=N. The encoding scheme may be as follows:

1) If n=1, set k=1 and $b_1=u_k=u_1$. Increment the information pointer k by one.
2) If n=2, use the following constraints to set $b_2$.

$$\text{If } \begin{pmatrix} a_{n-1}=0 & b_{n-1}=0 \\ a_n=0 \end{pmatrix}, \text{ then force } b_n=1.$$

$$\text{If } \begin{pmatrix} a_{n-1}=1 & b_{n-1}=0 \\ a_n=0 \end{pmatrix}, \text{ then force } b_n=0.$$

Note that this forcing happens irrespective of the value of the current information bit. In either case, the information pointer k is not incremented. It may be observed that if $b_n$ is forced to be 1 and the information bit $u_k$ to be sent at that time was also 1, it does not imply that useful information was transmitted on the line. Rather, the decoder (which will use the past state a) simply discards the information on that line. The two constraints above avoid the encoder going into the forbidden superstates. A look-ahead for the second bus line (line number 2) may then be performed.

$$\text{If } \begin{pmatrix} a_1=0 & b_1=0 \\ a_2=0 \\ a_3=1 \end{pmatrix}, \text{ then force } b_2=0.$$

$$\text{If } \begin{pmatrix} a_1=0 & b_1=0 \\ a_2=1 \\ a_3=0 \end{pmatrix}, \text{ then force } b_2=1.$$

If $\begin{pmatrix} a_1 = 1 & b_1 = 1 \\ a_2 = 0 & \\ a_3 = 1 & \end{pmatrix}$, then force $b_2 = 0$.

If $\begin{pmatrix} a_1 = 1 & b_1 = 1 \\ a_2 = 1 & \\ a_3 = 0 & \end{pmatrix}$, then force $b_2 = 1$.

These conditions reflect situations similar to those arising in Example 7 above. In all other cases, $b_2 = u_k$ and increment k by one.

3) If $n \in \{3, 4, \ldots, N\}$, use the following look-ahead constraints.

If $\begin{pmatrix} a_{n-2} = 0 & b_{n-2} = 0 \\ a_{n-1} = 0 & b_{n-1} = 0 \\ a_n = 0 & \\ a_{n+1} = 1 & \end{pmatrix}$, then force $b_n = 0$.

If $\begin{pmatrix} a_{n-2} = 0 & b_{n-2} = 0 \\ a_{n-1} = 0 & b_{n-1} = 0 \\ a_n = 1 & \\ a_{n+1} = 0 & \end{pmatrix}$, then force $b_n = 1$.

If $\begin{pmatrix} a_{n-2} = 0 & b_{n-2} = 0 \\ a_{n-1} = 1 & b_{n-1} = 1 \\ a_n = 0 & \\ a_{n+1} = 1 & \end{pmatrix}$, then force $b_n = 0$.

If $\begin{pmatrix} a_{n-2} = 0 & b_{n-2} = 0 \\ a_{n-1} = 1 & b_{n-1} = 1 \\ a_n = 1 & \\ a_{n+1} = 0 & \end{pmatrix}$, then force $b_n = 1$.

If $\begin{pmatrix} a_{n-2} = 1 & b_{n-2} = 1 \\ a_{n-1} = 0 & b_{n-1} = 0 \\ a_n = 0 & \\ a_{n+1} = 1 & \end{pmatrix}$, then force $b_n = 0$.

If $\begin{pmatrix} a_{n-2} = 1 & b_{n-2} = 1 \\ a_{n-1} = 0 & b_{n-1} = 0 \\ a_n = 1 & \\ a_{n+1} = 0 & \end{pmatrix}$, then force $b_n = 1$.

If $\begin{pmatrix} a_{n-2} = 0 & b_{n-2} = 1 \\ a_{n-1} = 0 & b_{n-1} = 0 \\ a_n = 1 & \\ a_{n+1} = 0 & \end{pmatrix}$, then force $b_n = 1$.

If $\begin{pmatrix} a_{n-2} = 0 & b_{n-2} = 1 \\ a_{n-1} = 1 & b_{n-1} = 1 \\ a_n = 1 & \\ a_{n+1} = 0 & \end{pmatrix}$, then force $b_n = 1$.

If $\begin{pmatrix} a_{n-2} = 1 & b_{n-2} = 0 \\ a_{n-1} = 0 & b_{n-1} = 0 \\ a_n = 0 & \\ a_{n+1} = 1 & \end{pmatrix}$, then force $b_n = 0$.

If $\begin{pmatrix} a_{n-2} = 1 & b_{n-2} = 0 \\ a_{n-1} = 1 & b_{n-1} = 1 \\ a_n = 0 & \\ a_{n+1} = 1 & \end{pmatrix}$, then force $b_n = 0$.

If $\begin{pmatrix} a_{n-2} = 1 & b_{n-2} = 1 \\ a_{n-1} = 1 & b_{n-1} = 1 \\ a_n = 0 & \\ a_{n+1} = 1 & \end{pmatrix}$, then force $b_n = 0$.

If $\begin{pmatrix} a_{n-2} = 1 & b_{n-2} = 1 \\ a_{n-1} = 1 & b_{n-1} = 1 \\ a_n = 1 & \\ a_{n+1} = 0 & \end{pmatrix}$, then force $b_n = 1$.

In either of the above twelve cases, the information counter k is not incremented. These conditions reflect situations similar to Example 7. The following conditions reflect the situation in Example 5.

If $\begin{pmatrix} a_{n-2} = 0 & b_{n-2} = 0 \\ a_{n-1} = 0 & b_{n-1} = 1 \\ a_n = 0 & \end{pmatrix}$, then force $b_n = 1$.

If $\begin{pmatrix} a_{n-2} = 0 & b_{n-2} = 0 \\ a_{n-1} = 1 & b_{n-1} = 0 \\ a_n = 1 & \end{pmatrix}$, then force $b_n = 0$.

If $\begin{pmatrix} a_{n-2} = 1 & b_{n-2} = 1 \\ a_{n-1} = 0 & b_{n-1} = 1 \\ a_n = 0 & \end{pmatrix}$, then force $b_n = 1$.

If $\begin{pmatrix} a_{n-2} = 1 & b_{n-2} = 1 \\ a_{n-1} = 1 & b_{n-1} = 0 \\ a_n = 1 & \end{pmatrix}$, then force $b_n = 0$.

Finally, there are also the following conditions that reflect the situation in Example 3 above.

If $\begin{pmatrix} a_{n-2} = 0 & b_{n-2} = 1 \\ a_{n-1} = 0 & b_{n-1} = 0 \\ a_n = 0 & \end{pmatrix}$, then force $b_n = 0$.

If $\begin{pmatrix} a_{n-2} = 0 & b_{n-2} = 1 \\ a_{n-1} = 0 & b_{n-1} = 1 \\ a_n = 1 & \end{pmatrix}$, then force $b_n = 1$.

If $\begin{pmatrix} a_{n-2} = 0 & b_{n-2} = 1 \\ a_{n-1} = 1 & b_{n-1} = 1 \\ a_n = 0 & \end{pmatrix}$, then force $b_n = 0$.

If $\begin{pmatrix} a_{n-2} = 1 & b_{n-2} = 0 \\ a_{n-1} = 0 & b_{n-1} = 0 \\ a_n = 1 & \end{pmatrix}$, then force $b_n = 1$.

If $\begin{pmatrix} a_{n-2} = 1 & b_{n-2} = 0 \\ a_{n-1} = 1 & b_{n-1} = 0 \\ a_n = 0 & \end{pmatrix}$, then force $b_n = 0$.

-continued $$\text{If} \begin{pmatrix} a_{n-2} = 1 & b_{n-2} = 0 \\ a_{n-1} = 1 & b_{n-1} = 1 \\ a_n = 1 & \end{pmatrix}, \text{then force } b_n = 1.$$

In all other cases, $b_n = u_k$ and increment k by one. For the look-ahead of line N, $a_{N+1} = a_N$.

The look-ahead encoder scheme is written more succinctly as shown in Algorithm 1 below. In the listing of Algorithm 1, the notation "∧" is used to denote a logical AND operation and the notation "∨" is used to denote a logical OR operation. The variable s is used to denote the forcing condition.

---
Algorithm 1 - Look-Ahead $\mathcal{M}_1$ -Encoder for N-Wire Bus
---

```
 1:  k ← 1
 2:  for n = 1 to N do
 3:      s ← 1
 4:      if n = 2 then
 5:          if ((a_{n-1} ≠ b_{n-1}) ∧ (a_n = b_{n-1}) ∨ ((a_{n-1} = b_{n-1}) ∧ (a_n ≠ a_{n+1}))
             then
 6:              b_n ← a_n
 7:              s ← 0
 8:          end if
 9:      else if n > 2 then
10:          if (a_{n-1} = b_{n-1}) ∧ (a_n ≠ a_{n+1}) ∧ ((a_{n-2} = b_{n-1}) ∨ (a_{n-2} = a_{n+1}))
             then
11:              b_n ← a_n
12:              s ← 0
13:          else if (a_{n-1} = b_{n-1}) ∧ (a_{n-2} ≠ b_{n-2}) ∧ (a_n = a_{n-2}) then
14:              b_n ← a_n
15:              s ← 0
16:          else if (a_{n-1} ≠ b_{n-1}) ∧ ((a_{n-2} = b_{n-2}) ∨ (a_n ≠ a_{n-1}) then
17:              b_n ← b_{n-1}
18:              s ← 0
19:          end if
20:      end if
21:      if s = 1 then
22:          b_n ← u_k
23:          k ← k + 1
24:      end if
25:  end for
```

Algorithm 1 loops over all bus wires using the counter n. To construct the input to bus line n, the algorithm checks if the past bus state risks a forbidden transition (see Lines 5, 10, 13 and 16). If in this situation, the bus line input is forced to repeat a preceding line input (see Line 17) or the same line input of the past state (see Lines 6, 11, 14). Otherwise, an information bit is sent over this bus input and the counter pointing to the next information bit is incremented (see Lines 22 and 23). Lines 5 and 10 of the algorithm allow the encoder to perform a single look-ahead. That is, the Lines 5 and 10 consider the input $a_{n+1}$ so that setting the current data line number n does not cause the encoder to become stuck in the bus lines to follow by encountering forbidden transitions.

In an aspect, the encoder of the present disclosure may have a variable-to-fixed length mapping. That is, the number of information bits sent over the bus during any clock cycle is variable. For example, if the bus is in the all-zero state, i.e., a=0, then more information bits can be sent over the bus during that cycle than if a=(0, 1, 0, 1, . . . ). Thus, a buffer may be needed for the incoming information bits to smooth the variable-rate behavior of the code.

At the decoder, the encoding scheme may be inverted. Thus, the past bus state may be used to decide whether a bit on a line is an information bit, or a forced bit (filler bit) which the decoder may simply discard.

In an aspect, the crosstalk avoidance code of the present disclosure achieves a higher bus transfer rate than a double-wire shielding scheme. The data rate of the double-wire shielding scheme may be approximately 0.33N for an N-wire bus. However, the data rate of the coding scheme described herein can be computed numerically to be approximately 0.51N. Thus, a greater than 50% increase in bus transfer rate is achieved using the coding scheme of the present disclosure compared to the double-wire shielding scheme. Both of these schemes may achieve the same transmission energy and delay reduction of up to a factor 4 compared to a baseline uncoded scheme.

Figure 4:
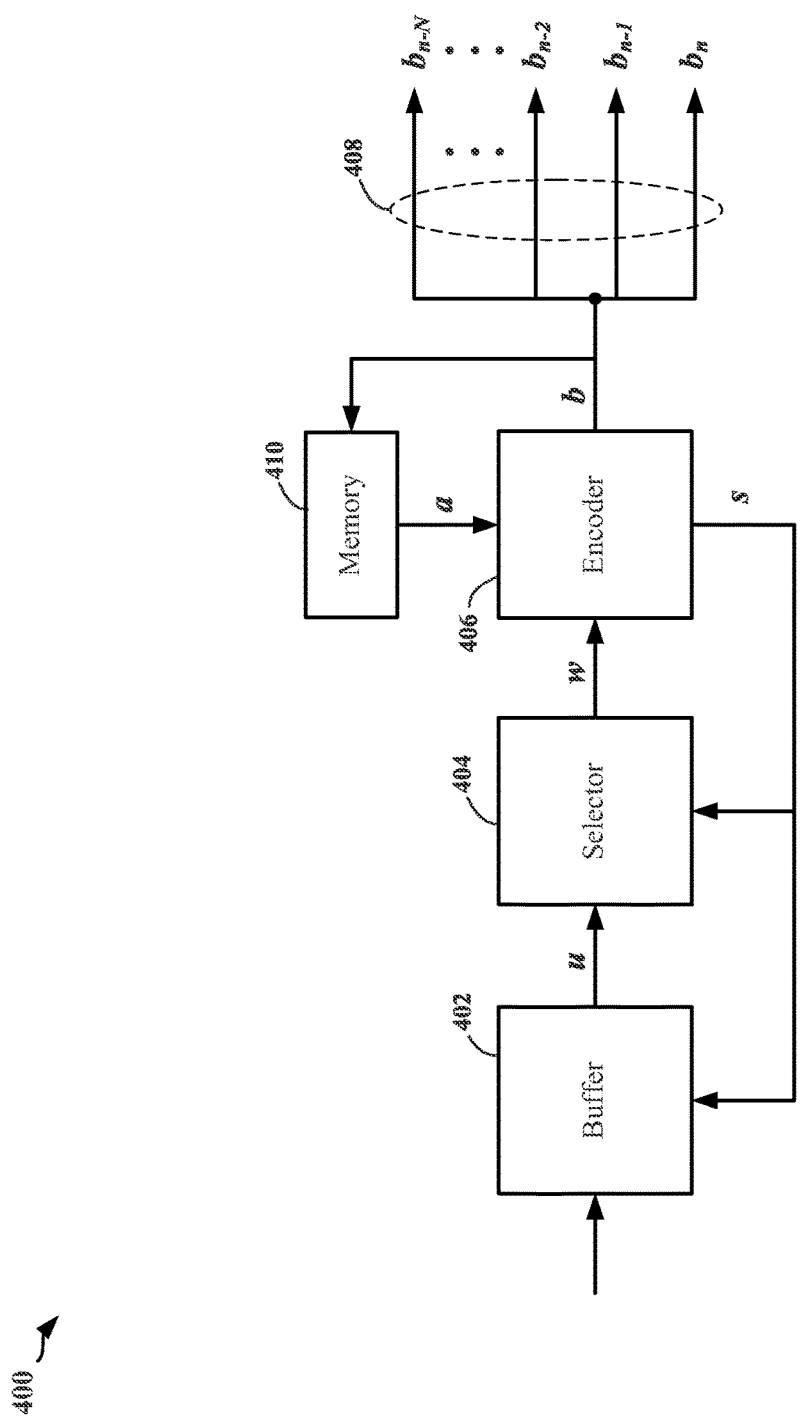
FIG. 4 illustrates an encoding architecture for transmitting data over a bus.

FIG. 4 illustrates an encoding architecture 400 for transmitting data over a bus. The architecture 400 may include a buffer 402, a selector 404, an encoder 406, a bus 408, and a memory 410. A stream of information bits is denoted by u. A past state of the bus 408 is stored in the memory 410 and is denoted by a. Combinational circuits of the selector 404 and the encoder 406 transform the information bits u to coded bits b, which are transmitted over the bus 408. Forcing variables may be denoted by s.

In more detail, the buffer 402 stores the information bits u in order to handle the variable-rate nature of the transmission scheme. The buffer 402 outputs a vector u of information bits to the selector 404. These bits are then transformed by the selector 404 into a vector w, which is input to the encoder 406. Combinational circuits of the encoder 406 transforms the vector w to coded bits b, which are then transmitted over the bus 408. The past bus state a is stored in the memory 410 and serves as additional input to the encoder 406.

For ease of discussion, an encoder operation for N=4 will be described in more detail below. The encoder for a general value of N operates analogously.

Figure 5:
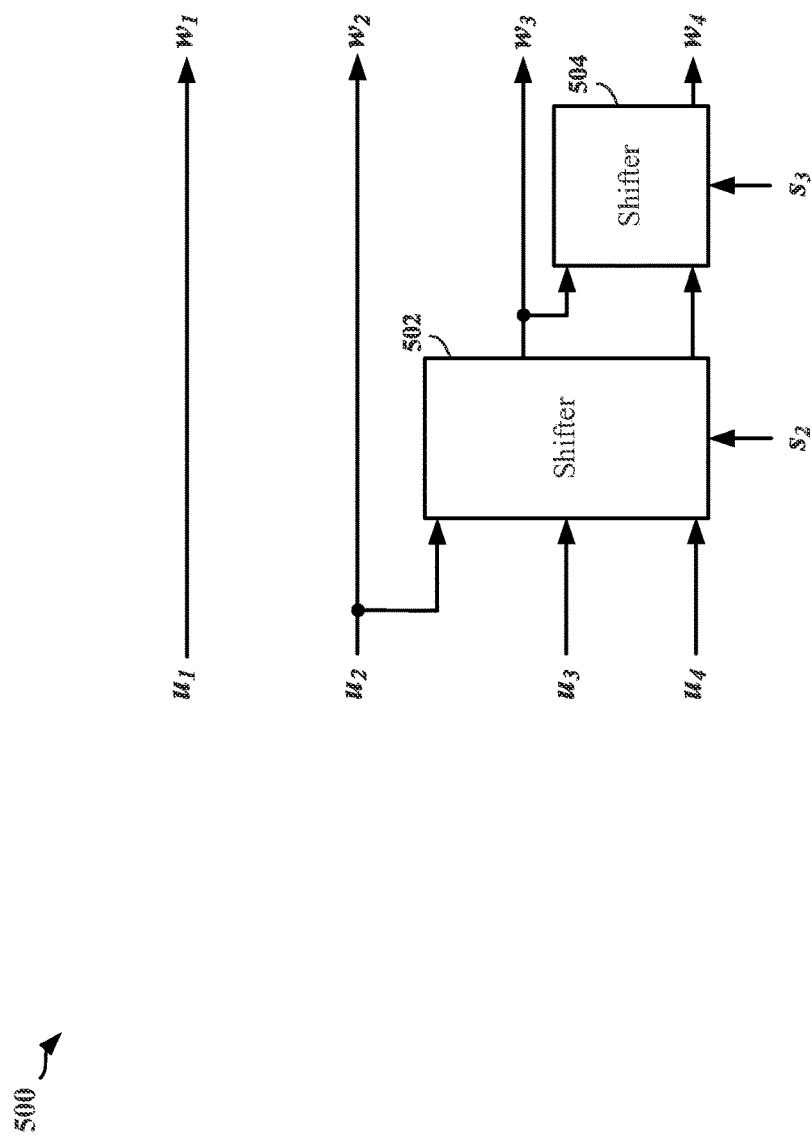
FIG. 5 is a selector circuit illustrating the details of a selector of FIG. 4.

FIG. 5 is a selector circuit 500 illustrating the details of the selector 404 of FIG. 4. For example, for N=4, the selector circuit 500 may be used to select a correct set of information bits for inputting to the encoder 406. The selector circuit 500 may include a first shifter 502 and a second shifter 504.

In order to avoid forbidden transitions on adjacent wires, not all bus lines may be able to transmit information bits (corresponds to Lines 6, 11, 14, 17 of Algorithm 1 above). This necessitates an encoding circuit (e.g., architecture 400) to keep track of the information bits that still need to be sent over the bus to ensure that none of the information bits are skipped for transmission (corresponds to variable k in Algorithm 1, see Lines 1 and 23). Accordingly, the selector circuit 500 performs this operation by, for example, keeping track of whether a bit in the coded bits b is a forced bit/filler bit or an information bit, and accordingly shifting the information bits to appropriate bus lines (i.e., bus lines capable of transmitting) to ensure that no information bits are skipped. For example, an information bit may be shifted to a subsequent bus line for transmission if such transmission does not cause a forbidden transition.

Let $s_n$ be equal to zero if the bit sent on bus line n is a forced bit, and equal to one otherwise. $s_n$ may be referred to as the forcing variable for line n. $k_n$ may be defined as follows:

$$k_n \stackrel{\Delta}{=} 1 + \sum_{\tilde{n}=1}^{n-1} s_{\tilde{n}}.$$

Accordingly, the output of the selector 404 is $w_n=U_{k_n}$. Here, $k_n$ corresponds to the counter k in Algorithm 1 above. Similarly, s corresponds to the variable s in Algorithm 1. The selector 404 operates in tandem with the encoder 406 and takes as input the forcing variables s. For example, referring to FIG. 5, the forcing variable $s_2$ for a second bus line (bus line 2) may be analyzed. $s_2$ is fed into the first shifter 502. If $s_2=1$, then $b_2$ is set to $u_2$ and the information bit to be considered for a third bus line (bus line 3) is $u_3$. The first shifter 502 thus selects $u_3$ and $u_4$ as outputs. On the other hand, if $s_2=0$, $b_2$ on bus line 2 is forced to be $b_1$. Hence, the information bit to be considered for bus line 3 is again $u_2$. The first shifter 502 thus selects $u_2$ and $u_3$ as outputs.

Figure 6:
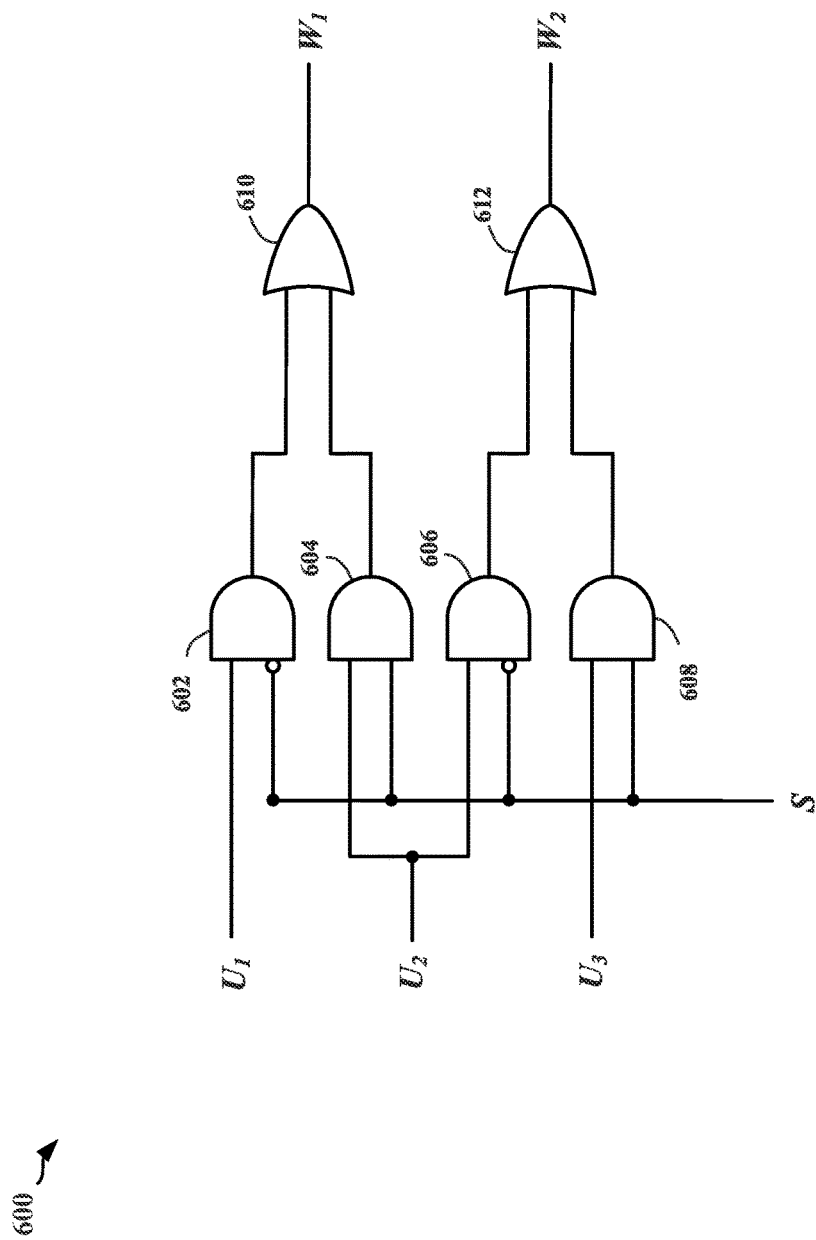
FIG. 6 is a shifter circuit illustrating the details of a first shifter and/or a second shifter of FIG. 5.

FIG. 6 is a shifter circuit 600 illustrating the details of the first shifter 502 and/or the second shifter 504 of FIG. 5. The shifter circuit 600 may include AND gates 602, 604, 606, 608 and OR gates 610, 612. In an aspect, a first AND gate 602 may receive as inputs $U_1$, and an inverse of S, a second AND gate 604 may receive as inputs $U_2$ and S, a third AND gate 606 may receive as inputs $U_2$ and an inverse of S, and a fourth AND gate 608 may receive as inputs $U_3$ and S. A first OR gate 610 may receive as inputs an output from the first AND gate 602 and an output from the second AND gate 604. A second OR gate 612 may receive as inputs an output from the third AND gate 606 and an output from the fourth AND gate 608. The first OR gate 610 may output $W_1$ and the second OR gate may output $W_2$. In an aspect, the input S is used to set either $W_1=U_1$, $W_2=U_2$ or $W_1=U_2$, $W_2=U_3$.

Figure 7:
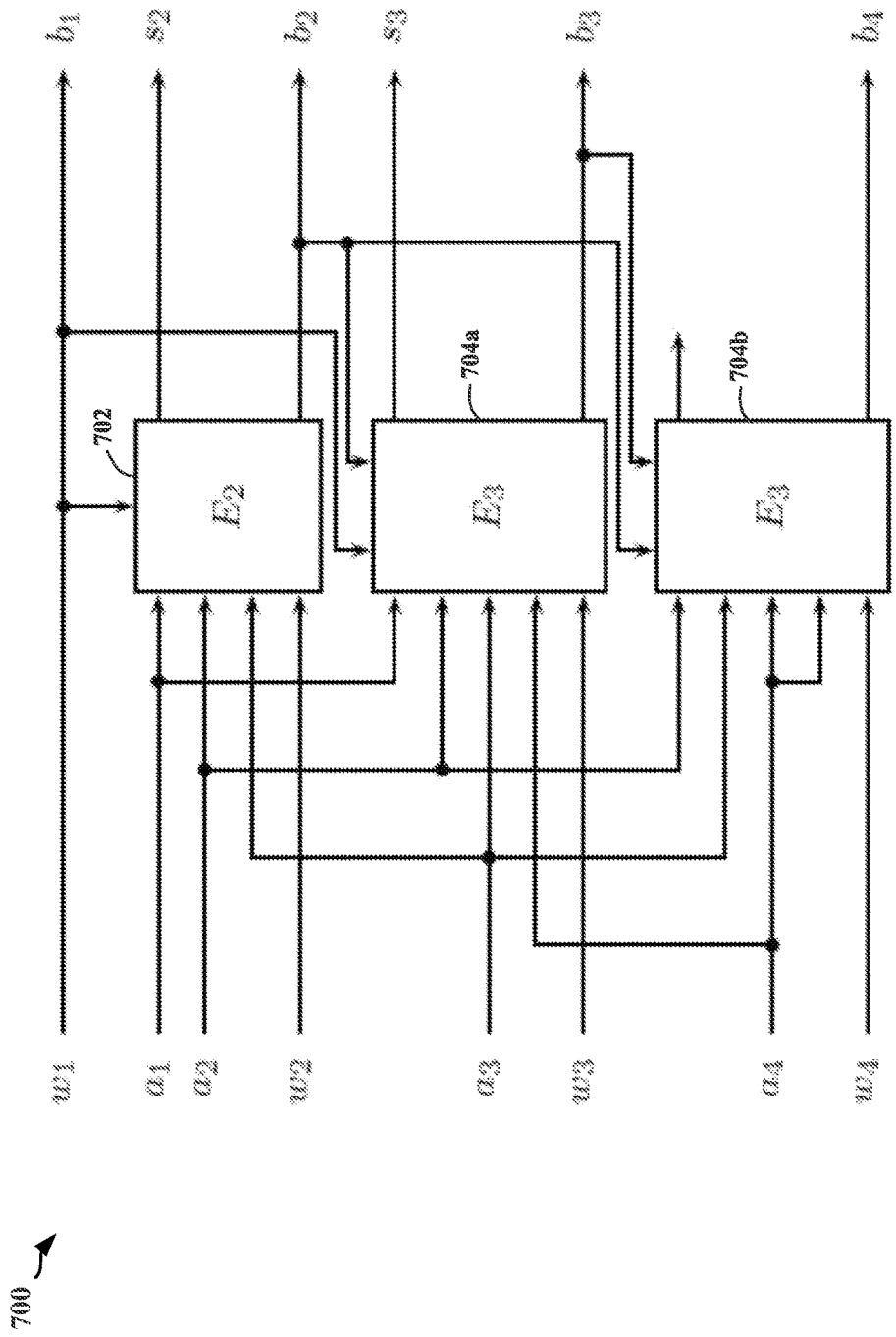
FIG. 7 is an encoding circuit illustrating the details of an encoder of FIG. 4.

FIG. 7 is an encoding circuit 700 illustrating the details of the encoder 406 of FIG. 4. The encoding circuit 700 may include a first combinational circuit $E_2$ 702 and two or more copies of a second combinational circuit $E_3$ 704a, 704b. In an aspect, the encoding circuit 700 receives an input from the selector 404 and the past state from the memory 410 and determines whether an information bit can be sent over a bus line, or whether the bus line is forced to carry a preceding bus line input or the same bus line input of the past state.

Figure 8:
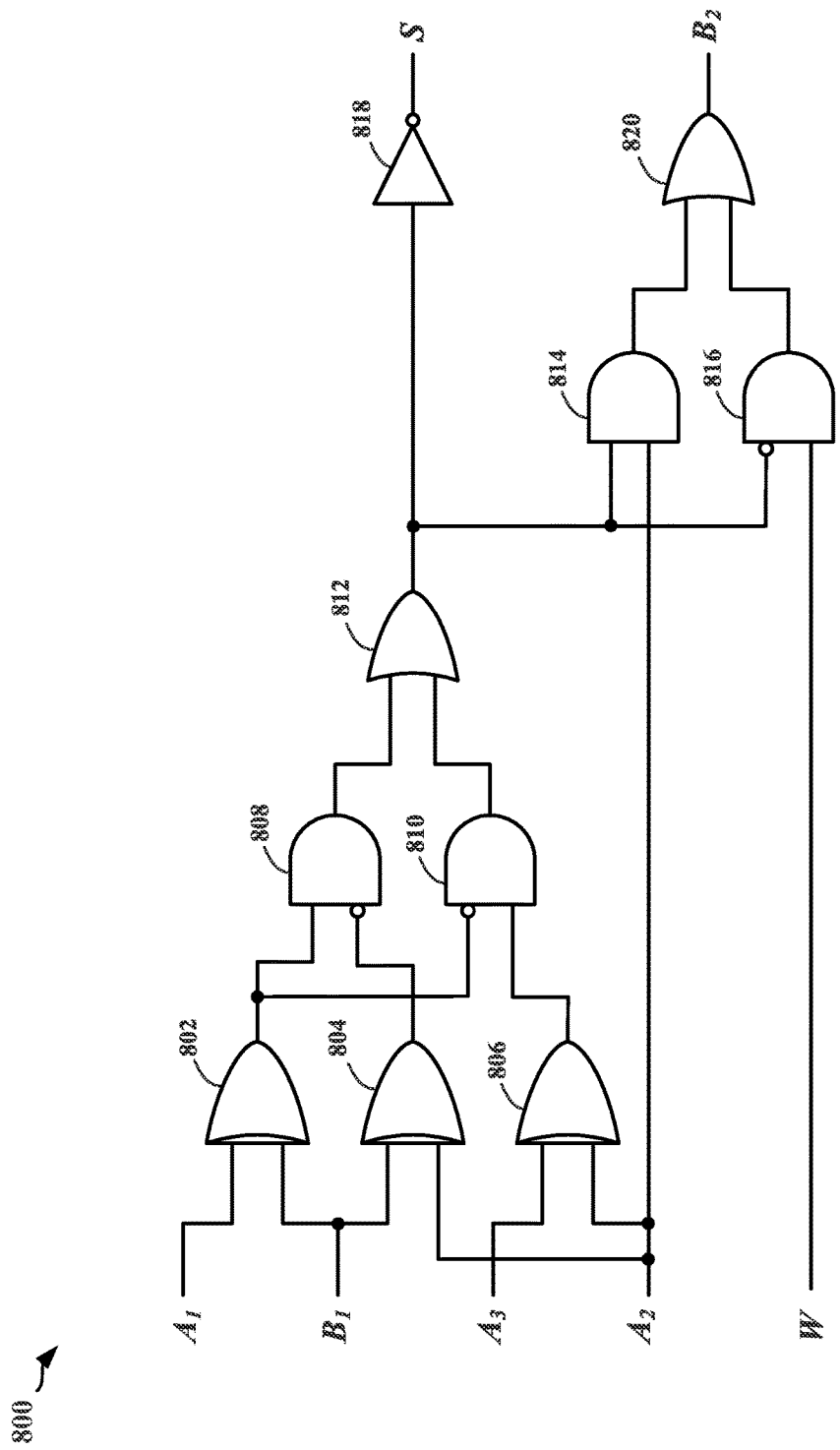
FIG. 8 is a circuit illustrating the details of a first combinational circuit of FIG. 7.

FIG. 8 is a combinational circuit 800 illustrating the details of the first combinational circuit $E_2$ 702 of FIG. 7. The combinational circuit 800 may include Exclusive OR gates 802, 804, 806, AND gates 808, 810, 814, 816, OR gates 812, 820, and an inverter 818. A first Exclusive OR gate 802 may receive as inputs $A_1$ and $B_1$, a second Exclusive OR gate 804 may receive as inputs $A_2$ and $B_1$, and a third Exclusive OR gate 806 may receive as inputs $A_2$ and $A_3$. A first AND gate 808 receives as inputs an output of the first Exclusive OR gate 802 and an inverse output of the second Exclusive OR gate 804. A second AND gate 810 receives as inputs an inverse output of the first Exclusive OR gate 802 and an output of the third Exclusive OR gate 806. A first OR gate 812 receives as inputs an output of the first AND gate 808 and an output of the second AND gate 810. A third AND gate 814 receives as inputs an output of the first OR gate 812 and $A_2$. A fourth AND gate 816 receives as inputs an inverse output of the first OR gate 812 and W. A second OR gate 820 receives as inputs an output of the third AND gate 814 and an output of the fourth AND gate 816. The second OR gate 820 outputs $B_2$. The inverter 818 receives as input the output of the first OR gate 812. The inverter 818 outputs S.

Referring to FIGS. 4 to 8, an encoding process for a second bus line (bus line 2) may be considered. Depending on the past state of the bus 408, $a_1$, $a_2$, $a_3$, and the bit $b_1$ sent over the previous bus line (bus line 1), the value $b_2$ of the current bus line is either forced to be $a_2$ or carries the information bit $w_2$. Thus, the inputs to the combinational circuit 800 (of the first combinational circuit $E_2$ 702) are $A_1=a_1$, $A_2=a_2$, $A_3=a_3$, $B_1=b_1$, and $W=w_2$. The forcing variable $S=s_2$ is set accordingly.

Figure 9:
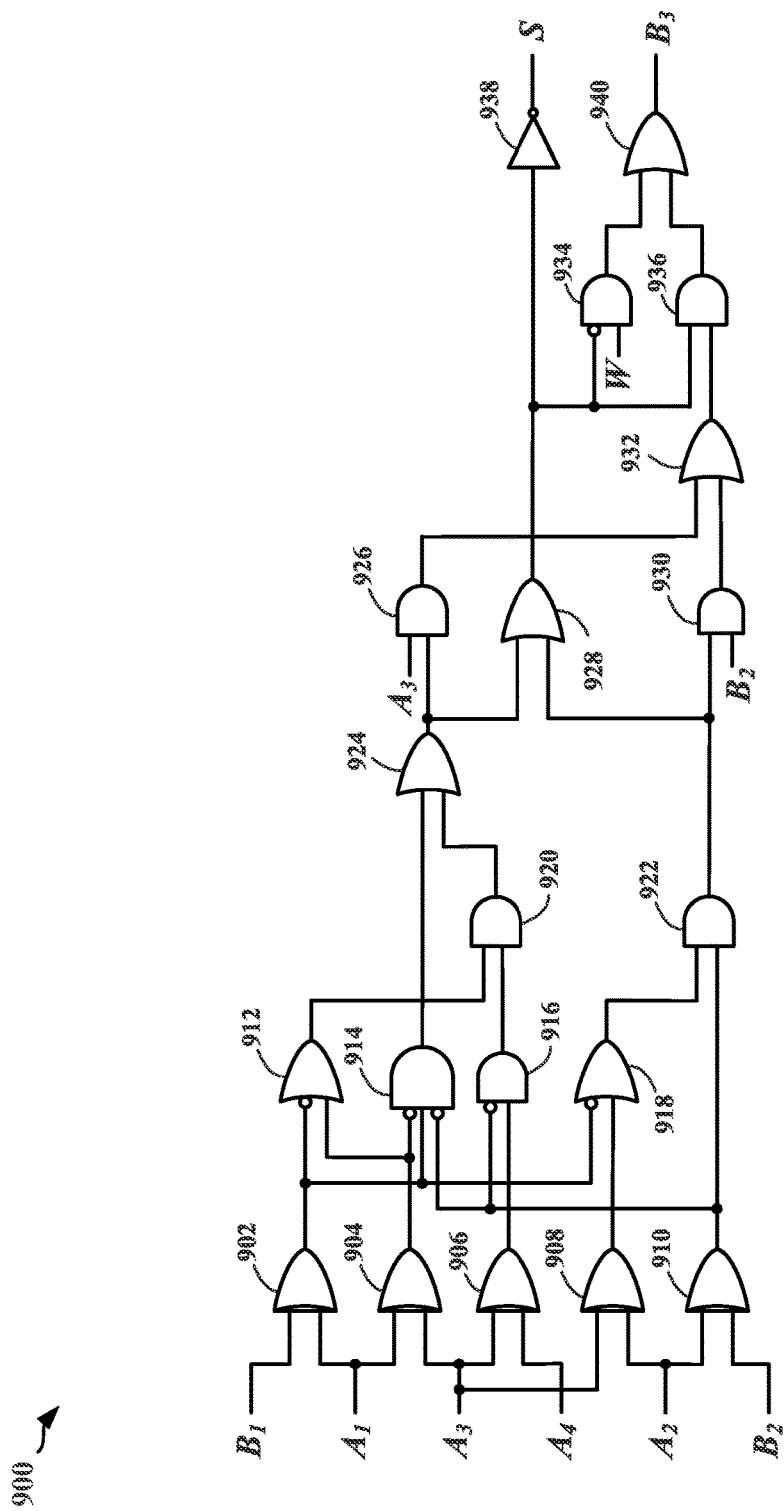
FIG. 9 is a circuit illustrating the details of a second combinational circuit of FIG. 7.

FIG. 9 is a combinational circuit 900 illustrating the details of the second combinational circuit $E_3$ (704a) of FIG. 7. The combinational circuit 900 may include Exclusive OR gates 902, 904, 906, 908, 910, AND gates 914, 916, 920, 922, 926, 930, 934, 936, OR gates 912, 918, 924, 928, 932, 940, and an inverter 938.

In an aspect, the inputs to the combinational circuit 900 (of the second combinational circuit $E_3$ 704a) are $A_1=a_{n+2}$, $A_2=a_{n-1}$, $A_3=a_n$, $A_4=a_{n+1}$, $B_1=b_{n-2}$, $B_2=b_{n-1}$, and $W=w_n$. The nth bus line then is either forced to carry the bit $a_n$ or $b_{n-1}$, or the bus line carries the information bit $w_n$. The forcing variable $S=s_n$ is set accordingly.

Referring back to FIG. 7, a bus of size N=4 is shown. As the bus length increases, one additional second combinational circuit $E_3$ 704b may be used for each new bus line. Thus, the number of gates added per bus line remains a constant and does not grow with N.

In an aspect, because both the selector 404 and the encoder 406 are combinational circuits, the transformation from information bits u to encoded bus values b may be performed in a single clock cycle. A critical path for the encoding circuitry for an N-wire bus may have a length of order $\Theta(N)$. One such path is $u_2 \to s_2 \to w_3 \to s_3 \to w_4 \to \ldots \to s_{N-1} \to b_N$. Another path of the same order length is $u_1 \to w_1 \to b_2 \to b_3 \to \ldots \to b_N$.

Figure 10:
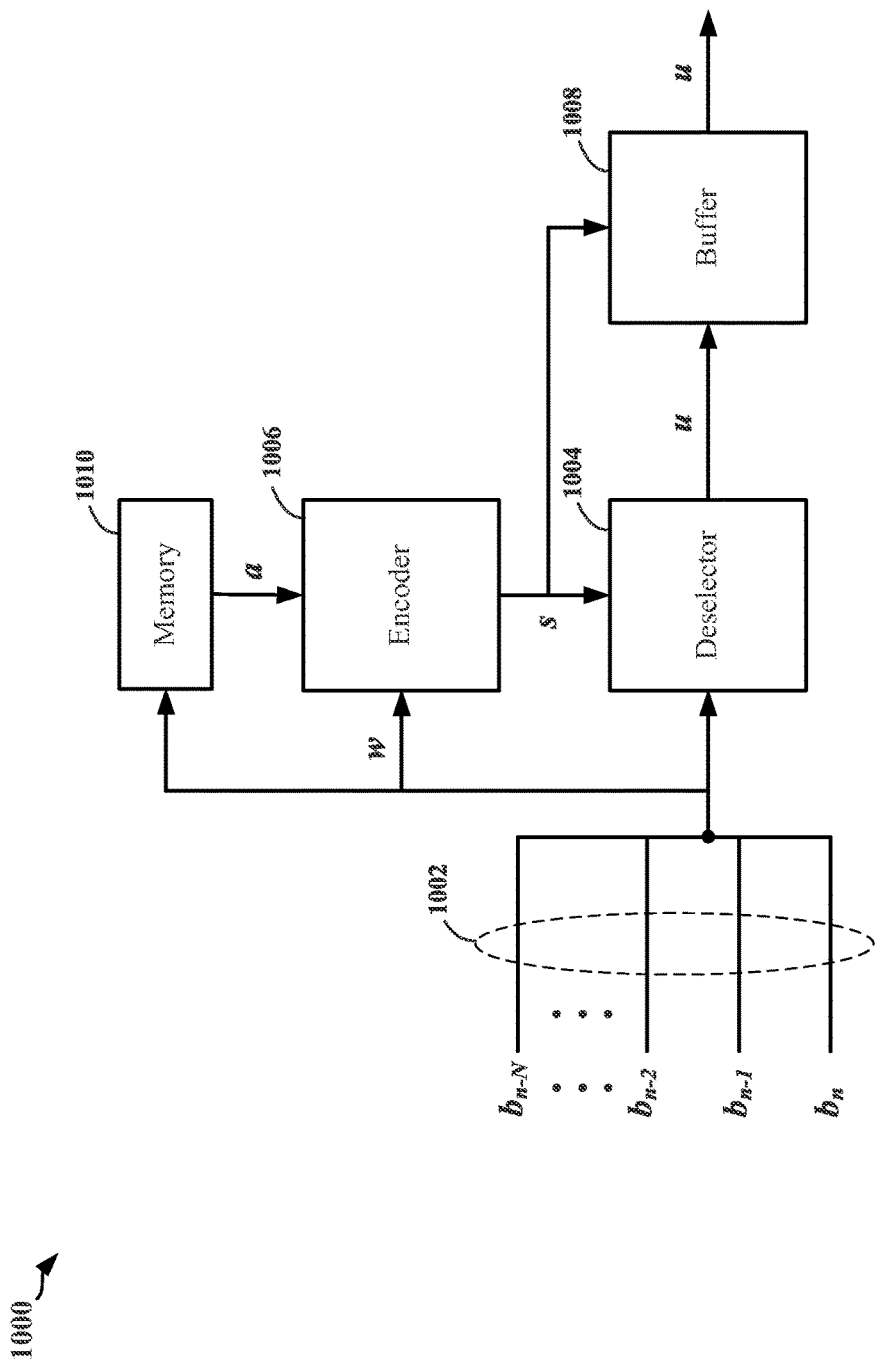
FIG. 10 illustrates a decoding architecture for receiving data over a bus.

FIG. 10 illustrates a decoding architecture 1000 for receiving data over a bus. The architecture 1000 may include a bus 1002, a deselector 1004, an encoder 1006, a buffer 1008, and a memory 1010. The decoding architecture 1000 reverses an encoder map to recover information bits from received bus outputs. The decoding architecture 1000 is similar to the encoding architecture 400 of FIG. 4. The encoder 1006 of FIG. 10 may operate in the same way as the encoder 406 of FIG. 4 to decide which bus lines of the bus 1002 carry forced bits/filler bits, and which bus lines carry information bits. A past state of the bus 1002 is stored in the memory 1010. The deselector 1004 (similar in structure to the selector 404 of FIG. 4) collects values from the bus lines that carry information bits. The buffer 1008 is used to handle the variable-rate nature of the transmission scheme. In an aspect, the decoding architecture 1000 performs a decoding operation (e.g., mapping from the bus outputs b back to the information bits u) using a combinational circuit(s) as described above, and can therefore be performed in a single clock cycle.

Exemplary Encoding Device and Method Thereon

Figure 11:
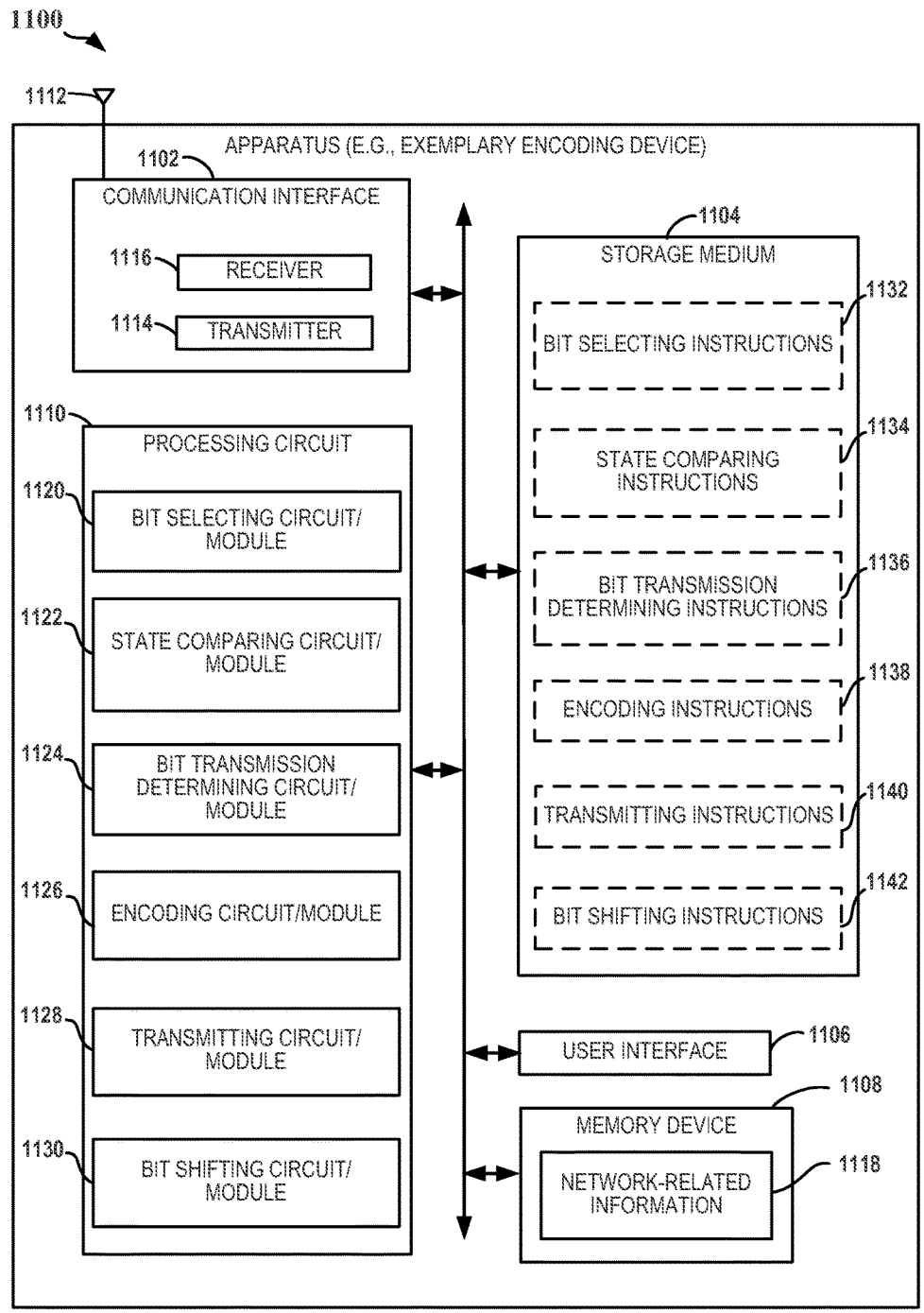
FIG. 11 is an illustration of an apparatus configured to support operations related to transmitting data bits over a multi-line parallel bus according to one or more aspects of the disclosure.

FIG. 11 is an illustration of an apparatus 1100 configured to support operations related to transmitting data bits over a multi-line parallel bus according to one or more aspects of the disclosure (e.g., aspects related to the method of FIG. 12 described below). The apparatus 1100 includes a communication interface (e.g., at least one transceiver) 1102, a storage medium 1104, a user interface 1106, a memory device 1108, and a processing circuit 1110.

These components can be coupled to and/or placed in electrical communication with one another via a signaling bus or other suitable component, represented generally by the connection lines in FIG. 11. The signaling bus may include any number of interconnecting buses and bridges depending on the specific application of the processing circuit 1110 and the overall design constraints. The signaling bus links together various circuits such that each of the communication interface 1102, the storage medium 1104, the user interface 1106, and the memory device 1108 are coupled to and/or in electrical communication with the processing circuit 1110. The signaling bus may also link various other circuits (not shown) such as timing sources, peripherals, voltage regulators, and power management circuits, which are well known in the art, and therefore, will not be described any further.

The communication interface 1102 may be adapted to facilitate wireless communication of the apparatus 1100. For example, the communication interface 1102 may include circuitry and/or code (e.g., instructions) adapted to facilitate the communication of information bi-directionally with respect to one or more communication devices in a network. The communication interface 1102 may be coupled to one or more antennas 1112 for wireless communication within a wireless communication system. The communication interface 1102 can be configured with one or more standalone receivers and/or transmitters, as well as one or more transceivers. In the illustrated example, the communication interface 1102 includes a transmitter 1114 and a receiver 1116.

The memory device 1108 may represent one or more memory devices. As indicated, the memory device 1108 may maintain network-related information 1118 along with other information used by the apparatus 1100. In some implementations, the memory device 1108 and the storage medium 1104 are implemented as a common memory component. The memory device 1108 may also be used for storing data that is manipulated by the processing circuit 1110 or some other component of the apparatus 1100.

The storage medium 1104 may represent one or more computer-readable, machine-readable, and/or processor-readable devices for storing code, such as processor executable code or instructions (e.g., software, firmware), electronic data, databases, or other digital information. The storage medium 1104 may also be used for storing data that is manipulated by the processing circuit 1110 when executing code. The storage medium 1104 may be any available media that can be accessed by a general purpose or special purpose processor, including portable or fixed storage devices, optical storage devices, and various other mediums capable of storing, containing or carrying code.

By way of example and not limitation, the storage medium 1104 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing code that may be accessed and read by a computer. The storage medium 1104 may be embodied in an article of manufacture (e.g., a computer program product). By way of example, a computer program product may include a computer-readable medium in packaging materials. In view of the above, in some implementations, the storage medium 1104 may be a non-transitory (e.g., tangible) storage medium.

The storage medium 1104 may be coupled to the processing circuit 1110 such that the processing circuit 1110 can read information from, and write information to, the storage medium 1104. That is, the storage medium 1104 can be coupled to the processing circuit 1110 so that the storage medium 1104 is at least accessible by the processing circuit 1110, including examples where at least one storage medium is integral to the processing circuit 1110 and/or examples where at least one storage medium is separate from the processing circuit 1110 (e.g., resident in the apparatus 1100, external to the apparatus 1100, distributed across multiple entities, etc.).

Code and/or instructions stored by the storage medium 1104, when executed by the processing circuit 1110, causes the processing circuit 1110 to perform one or more of the various functions and/or process operations described herein. For example, the storage medium 1104 may include operations configured for regulating operations at one or more hardware blocks of the processing circuit 1110, as well as to utilize the communication interface 1102 for wireless communication utilizing their respective communication protocols.

The processing circuit 1110 is generally adapted for processing, including the execution of such code/instructions stored on the storage medium 1104. As used herein, the term "code" or "instructions" shall be construed broadly to include without limitation programming, instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1110 is arranged to obtain, process and/or send data, control data access and storage, issue commands, and control other desired operations. The processing circuit 1110 may include circuitry configured to implement desired code provided by appropriate media in at least one example. For example, the processing circuit 1110 may be implemented as one or more processors, one or more controllers, and/or other structure configured to execute executable code. Examples of the processing circuit 1110 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1110 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1110 are for illustration and other suitable configurations within the scope of the disclosure are also contemplated.

According to one or more aspects of the disclosure, the processing circuit 1110 may be adapted to perform any or all of the features, processes, functions, operations and/or routines for any or all of the apparatuses described herein. As used herein, the term "adapted" in relation to the processing circuit 1110 may refer to the processing circuit 1110 being one or more of configured, employed, implemented, and/or programmed to perform a particular process, function, operation and/or routine according to various features described herein.

Figure 12:
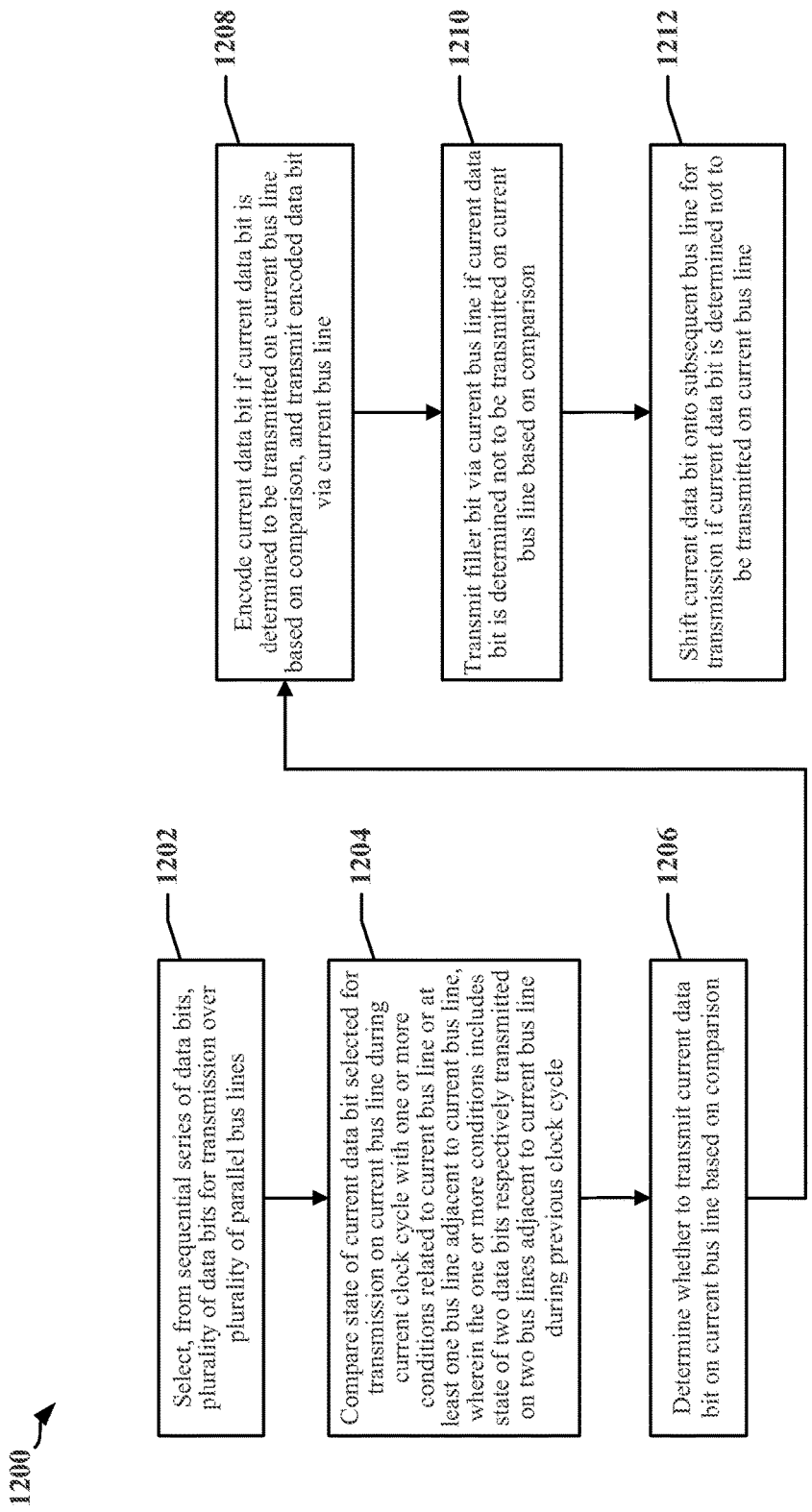
FIG. 12 is a flowchart illustrating a method of transmitting data bits over a multi-line parallel bus.

According to at least one example of the apparatus 1100, the processing circuit 1110 may include one or more of a bit selecting circuit/module 1120, a state comparing circuit/module 1122, a bit transmission determining circuit/module 1124, an encoding circuit/module 1126, a transmitting circuit/module 1128, and a bit shifting circuit/module 1130 that are adapted to perform any or all of the features, processes, functions, operations and/or routines described herein (e.g., features, processes, functions, operations and/or routines described with respect to FIG. 12 and/or Algorithm 1).

The bit selecting circuit/module 1120 may include circuitry and/or instructions (e.g., bit selecting instructions 1132 stored on the storage medium 1104) adapted to perform several functions relating to, for example, selecting, from a sequential series of data bits, a plurality of data bits for transmission over a plurality of parallel bus lines.

The state comparing circuit/module 1122 may include circuitry and/or instructions (e.g., state comparing instructions 1134 stored on the storage medium 1104) adapted to perform several functions relating to, for example, comparing a state of a current data bit selected for transmission on a current bus line during a current clock cycle with one or more conditions related to the current bus line or at least one bus line adjacent to the current bus line.

The bit transmission determining circuit/module 1124 may include circuitry and/or instructions (e.g., bit transmission determining instructions 1136 stored on the storage medium 1104) adapted to perform several functions relating to, for example, determining whether to transmit the current data bit on the current bus line based on the comparison.

The encoding circuit/module 1126 may include circuitry and/or instructions (e.g., encoding instructions 1138 stored on the storage medium 1104) adapted to perform several functions relating to, for example, encoding the current data bit if the current data bit is determined to be transmitted on the current bus line based on the comparison.

The transmitting circuit/module 1128 may include circuitry and/or instructions (e.g., transmitting instructions 1140 stored on the storage medium 1104) adapted to perform several functions relating to, for example, transmitting the encoded data bit via the current bus line and/or transmitting a filler bit via the current bus line if the current data bit is determined not to be transmitted on the current bus line based on the comparison.

The bit shifting circuit/module 1130 may include circuitry and/or instructions (e.g., bit shifting instructions 1142 stored on the storage medium 1104) adapted to perform several functions relating to, for example, shifting the current data bit onto a subsequent bus line for transmission if the current data bit is determined not to be transmitted on the current bus line.

As mentioned above, instructions stored by the storage medium 1104, when executed by the processing circuit 1110, causes the processing circuit 1110 to perform one or more of the various functions and/or process operations described herein. For example, the storage medium 1104 may include one or more of the bit selecting instructions 1132, the state comparing instructions 1134, the bit transmission determining instructions 1136, the encoding instructions 1138, the transmitting instructions 1140, and the bit shifting instructions 1142.

FIG. 12 is a flowchart 1200 illustrating a method of transmitting data bits over a multi-line parallel bus. The method may be performed by an encoding device (e.g., apparatus 100 implementing encoding architecture 400 or apparatus 1100 of FIG. 11).

The encoding device selects, from a sequential series of data bits, a plurality of data bits for transmission over a plurality of parallel bus lines 1202. The encoding device may then perform a number of operations (e.g., operations 1204, 1206, 1208, 1210, and/or 1212) for each bus line of the plurality of parallel bus lines.

In an aspect, a current bus line may be denoted by n, a bus state of a previous clock cycle (past bus state) may be denoted by a, and a bus state of a current clock cycle (current bus state) may be denoted b. The encoding device compares a state of a current data bit selected for transmission on a current bus line during a current clock cycle (e.g., $b_n$) with one or more conditions related to the current bus line or at least one bus line adjacent to the current bus line 1204. The one or more conditions may include a state of a previous data bit transmitted on the current bus line during a previous clock cycle (e.g., $a_n$), a state of two data bits respectively transmitted on two bus lines adjacent to the current bus line during the previous clock cycle (e.g., bus states $a_{n-2}$ and $a_{n-1}$ or bus states $a_{n-1}$ and $a_{n+1}$), and/or a state of at least one data bit respectively transmitted on the at least one bus line adjacent to the current bus line during the current clock cycle (e.g., $b_{n-2}$ and/or $b_{n-1}$).

In an aspect, the encoding device compares the state of the current data bit to the one or more conditions to ensure that the transmission of the current data bit on the current bus line at a present time will not lead to the creation of one of the 14 forbidden transitions (as described above) on three consecutive bus lines.

The encoding device determines whether to transmit the current data bit on the current bus line based on the comparison 1206. For example, if the encoding device determines from the comparison that the transmission of the current data bit on the current bus line will not create a forbidden transition, the encoding device will facilitate transmission of the current data bit on the current bus line. However, if the encoding device determines from the comparison that the transmission of the current data bit on the current bus line will create a forbidden transition, the encoding device will refrain from transmitting the current data bit on the current bus line.

The encoding device encodes the current data bit if the current data bit is determined to be transmitted on the current bus line based on the comparison 1208. Moreover, the encoding device transmits the encoded data bit via the current bus line.

The encoding device may transmit a filler bit (forced bit) via the current bus line if the current data bit is determined not to be transmitted on the current bus line based on the comparison 1210. In an aspect, a receiver of the filler bit/forced bit is configured to discard the filler bit/forced bit when received on the current bus line as the receiver will know that such bit does not contain any relevant information.

The encoding device may shift the current data bit onto a subsequent bus line for transmission if the current data bit is determined not to be transmitted on the current bus line based on the comparison 1212.

In an aspect, the encoding device may compare the state of the current data bit selected for transmission on the current bus line during the current clock cycle (e.g., $b_n$) with one or more conditions related to the current bus line or the at least one bus line adjacent to the current bus line 1204, and determine whether to transmit the current data bit on the current bus line based on the comparison 1206, for all bus lines of the plurality of bus lines during one clock cycle.

In a further aspect, the encoding device may compare the state of the current data bit selected for transmission on the current bus line during the current clock cycle (e.g., $b_n$) with one or more conditions related to the current bus line or the at least one bus line adjacent to the current bus line 1204, and determine whether to transmit the current data bit on the current bus line based on the comparison 1206, for each bus line of the plurality of bus lines in a sequential manner.

Exemplary Decoding Device and Method Thereon

Figure 13:
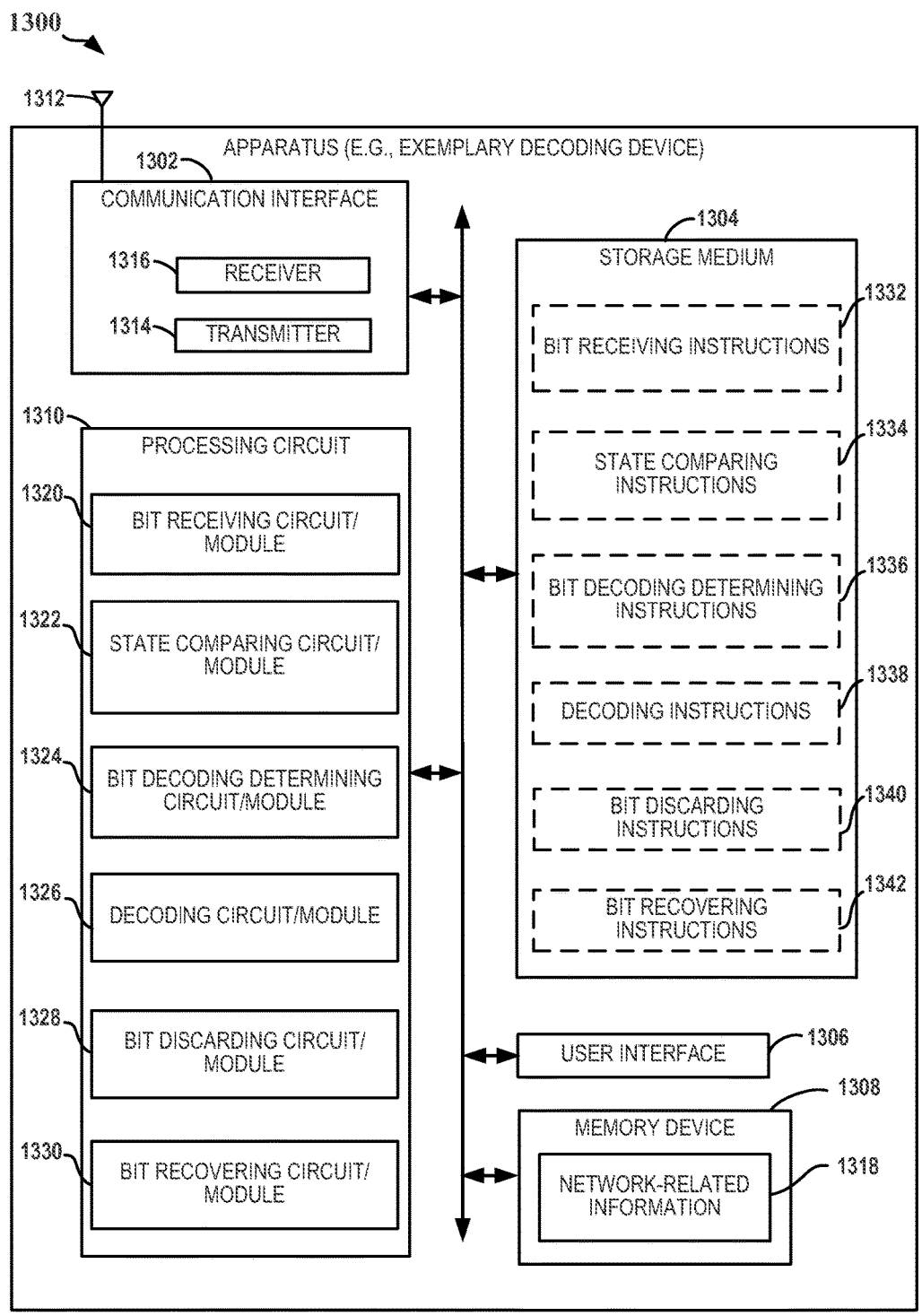
FIG. 13 is an illustration of an apparatus configured to support operations related to receiving data bits over a multi-line parallel bus according to one or more aspects of the disclosure.

FIG. 13 is an illustration of an apparatus 1300 configured to support operations related to receiving data bits over a multi-line parallel bus according to one or more aspects of the disclosure (e.g., aspects related to the method of FIG. 14 described below). The apparatus 1300 includes a communication interface (e.g., at least one transceiver) 1302, a storage medium 1304, a user interface 1306, a memory device 1308, and a processing circuit 1310.

These components can be coupled to and/or placed in electrical communication with one another via a signaling bus or other suitable component, represented generally by the connection lines in FIG. 13. The signaling bus may include any number of interconnecting buses and bridges depending on the specific application of the processing circuit 1310 and the overall design constraints. The signaling bus links together various circuits such that each of the communication interface 1302, the storage medium 1304, the user interface 1306, and the memory device 1308 are coupled to and/or in electrical communication with the processing circuit 1310. The signaling bus may also link various other circuits (not shown) such as timing sources, peripherals, voltage regulators, and power management circuits, which are well known in the art, and therefore, will not be described any further.

The communication interface 1302 may be adapted to facilitate wireless communication of the apparatus 1300. For example, the communication interface 1302 may include circuitry and/or code (e.g., instructions) adapted to facilitate the communication of information bi-directionally with respect to one or more communication devices in a network. The communication interface 1302 may be coupled to one or more antennas 1312 for wireless communication within a wireless communication system. The communication interface 1302 can be configured with one or more standalone receivers and/or transmitters, as well as one or more transceivers. In the illustrated example, the communication interface 1302 includes a transmitter 1314 and a receiver 1316.

The memory device 1308 may represent one or more memory devices. As indicated, the memory device 1308 may maintain network-related information 1318 along with other information used by the apparatus 1300. In some implementations, the memory device 1308 and the storage medium 1304 are implemented as a common memory component. The memory device 1308 may also be used for storing data that is manipulated by the processing circuit 1310 or some other component of the apparatus 1300.

The storage medium 1304 may represent one or more computer-readable, machine-readable, and/or processor-readable devices for storing code, such as processor executable code or instructions (e.g., software, firmware), electronic data, databases, or other digital information. The storage medium 1304 may also be used for storing data that is manipulated by the processing circuit 1310 when executing code. The storage medium 1304 may be any available media that can be accessed by a general purpose or special purpose processor, including portable or fixed storage devices, optical storage devices, and various other mediums capable of storing, containing or carrying code.

By way of example and not limitation, the storage medium 1304 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing code that may be accessed and read by a computer. The storage medium 1304 may be embodied in an article of manufacture (e.g., a computer program product). By way of example, a computer program product may include a computer-readable medium in packaging materials. In view of the above, in some implementations, the storage medium 1304 may be a non-transitory (e.g., tangible) storage medium.

The storage medium 1304 may be coupled to the processing circuit 1310 such that the processing circuit 1310 can read information from, and write information to, the storage medium 1304. That is, the storage medium 1304 can be coupled to the processing circuit 1310 so that the storage medium 1304 is at least accessible by the processing circuit 1310, including examples where at least one storage medium is integral to the processing circuit 1310 and/or examples where at least one storage medium is separate from the processing circuit 1310 (e.g., resident in the apparatus 1300, external to the apparatus 1300, distributed across multiple entities, etc.).

Code and/or instructions stored by the storage medium 1304, when executed by the processing circuit 1310, causes the processing circuit 1310 to perform one or more of the various functions and/or process operations described herein. For example, the storage medium 1304 may include operations configured for regulating operations at one or more hardware blocks of the processing circuit 1310, as well as to utilize the communication interface 1302 for wireless communication utilizing their respective communication protocols.

The processing circuit 1310 is generally adapted for processing, including the execution of such code/instructions stored on the storage medium 1304. As used herein, the term "code" or "instructions" shall be construed broadly to include without limitation programming, instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1310 is arranged to obtain, process and/or send data, control data access and storage, issue commands, and control other desired operations. The processing circuit 1310 may include circuitry configured to implement desired code provided by appropriate media in at least one example. For example, the processing circuit 1310 may be implemented as one or more processors, one or more controllers, and/or other structure configured to execute executable code. Examples of the processing circuit 1310 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1310 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1310 are for illustration and other suitable configurations within the scope of the disclosure are also contemplated.

According to one or more aspects of the disclosure, the processing circuit 1310 may be adapted to perform any or all of the features, processes, functions, operations and/or routines for any or all of the apparatuses described herein. As used herein, the term "adapted" in relation to the processing circuit 1310 may refer to the processing circuit 1310 being one or more of configured, employed, implemented, and/or programmed to perform a particular process, function, operation and/or routine according to various features described herein.

According to at least one example of the apparatus 1300, the processing circuit 1310 may include one or more of a bit receiving circuit/module 1320, a state comparing circuit/module 1322, a bit decoding determining circuit/module 1324, a decoding circuit/module 1326, a bit discarding circuit/module 1328, and a bit recovering circuit/module 1330 that are adapted to perform any or all of the features, processes, functions, operations and/or routines described herein (e.g., features, processes, functions, operations and/or routines described with respect to FIG. 12 and/or Algorithm 1).

The bit receiving circuit/module 1320 may include circuitry and/or instructions (e.g., bit receiving instructions 1332 stored on the storage medium 1304) adapted to perform several functions relating to, for example, receiving a plurality of data bits over a plurality of parallel bus lines.

The state comparing circuit/module 1322 may include circuitry and/or instructions (e.g., state comparing instructions 1334 stored on the storage medium 1304) adapted to perform several functions relating to, for example, comparing a state of a current data bit received on a current bus line during a current clock cycle with one or more conditions related to the current bus line or at least one bus line adjacent to the current bus line.

The bit decoding determining circuit/module 1324 may include circuitry and/or instructions (e.g., bit decoding determining instructions 1336 stored on the storage medium 1304) adapted to perform several functions relating to, for example, determining whether to decode the current data bit on the current bus line based on the comparison.

The decoding circuit/module 1326 may include circuitry and/or instructions (e.g., decoding instructions 1338 stored on the storage medium 1304) adapted to perform several functions relating to, for example, decoding the current data bit if the current data bit is determined to be decoded based on the comparison.

The bit discarding circuit/module 1328 may include circuitry and/or instructions (e.g., bit discarding instructions 1340 stored on the storage medium 1304) adapted to perform several functions relating to, for example, discarding the current data bit if the current data bit is determined not to be decoded based on the comparison.

The bit recovering circuit/module 1330 may include circuitry and/or instructions (e.g., bit recovering instructions 1342 stored on the storage medium 1304) adapted to perform several functions relating to, for example, recovering a sequential series of data bits based on a plurality of current data bits decoded from the plurality of parallel bus lines.

As mentioned above, instructions stored by the storage medium 1304, when executed by the processing circuit 1310, causes the processing circuit 1310 to perform one or more of the various functions and/or process operations described herein. For example, the storage medium 1304 may include one or more of the bit receiving instructions 1332, the state comparing instructions 1334, the bit decoding determining instructions 1336, the decoding instructions 1338, the bit discarding instructions 1340, and the bit recovering instructions 1342.

Figure 14:
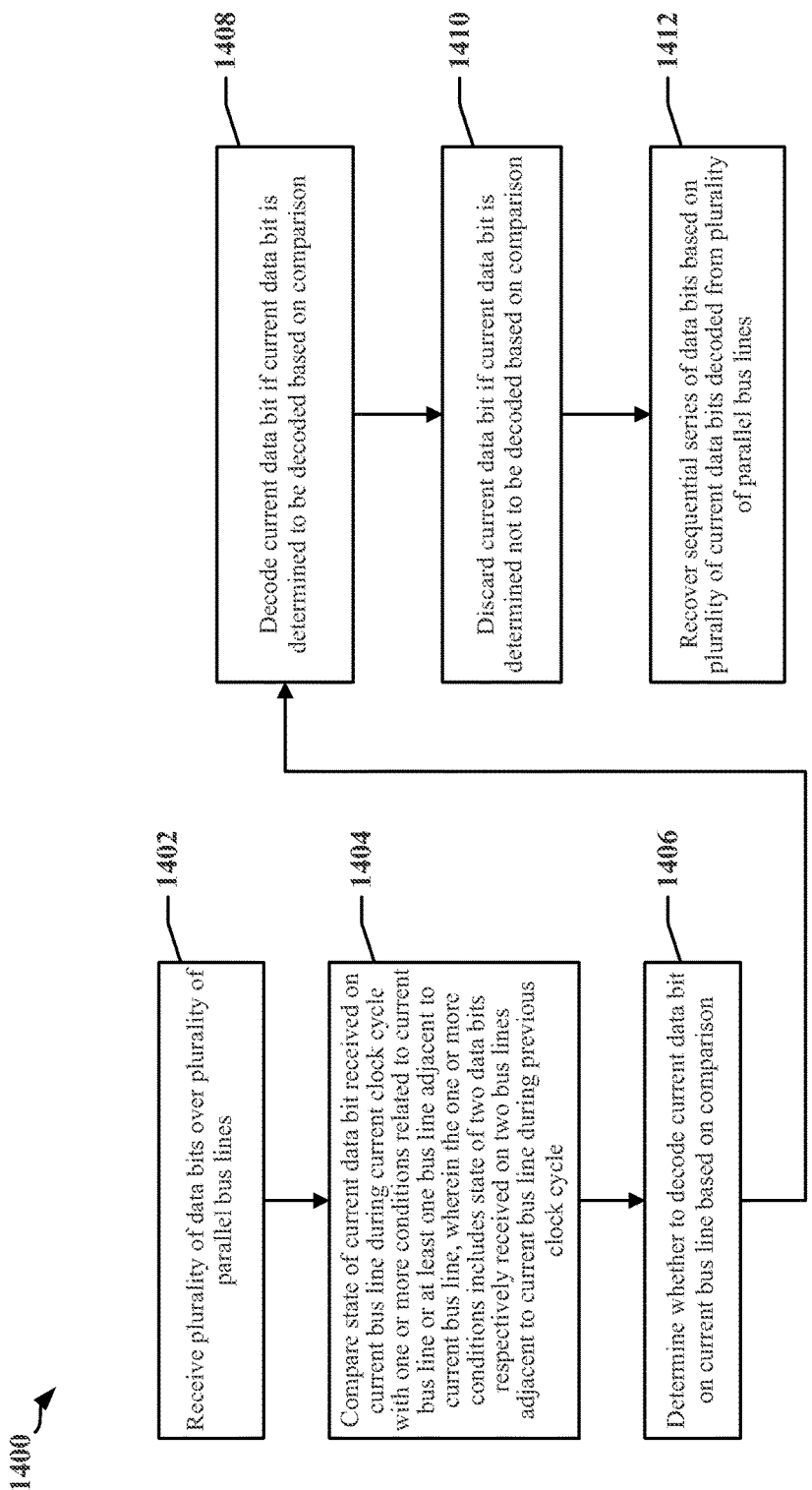
FIG. 14 is a flowchart illustrating a method of receiving data bits over a multi-line parallel bus.

FIG. 14 is a flowchart 1400 illustrating a method of receiving data bits over a multi-line parallel bus. The method may be performed by a decoding device (e.g., apparatus 100 implementing decoding architecture 1000 or apparatus 1300 of FIG. 13).

The decoding device receives a plurality of data bits over a plurality of parallel bus lines 1402. The decoding device may then perform a number of operations (e.g., operations 1404, 1406, 1408, and/or 1410) for each bus line of the plurality of parallel bus lines.

In an aspect, a current bus line may be denoted by n, a bus state of a previous clock cycle (past bus state) may be denoted by a, and a bus state of a current clock cycle (current bus state) may be denoted b. The decoding device compares a state of a current data bit received on a current bus line during a current clock cycle (e.g., $b_n$) with one or more conditions related to the current bus line or at least one bus line adjacent to the current bus line 1404. The one or more conditions may include a state of a previous data bit received on the current bus line during a previous clock cycle (e.g., $a_n$), a state of two data bits respectively received on two bus lines adjacent to the current bus line during the previous clock cycle (e.g., bus states $a_{n-2}$ and $a_{n-1}$ or bus states $a_{n-1}$ and $a_{n+1}$), and/or a state of at least one data bit respectively received on the at least one bus line adjacent to the current bus line during the current clock cycle (e.g., $b_{n-2}$ and/or $b_{n-1}$).

In an aspect, the decoding device compares the state of the current data bit to the one or more conditions to ensure that the received current data bit on the current bus line does not lead to the creation of one of the 14 forbidden transitions (as described above) on three consecutive bus lines.

The decoding device determines whether to decode the current data bit on the current bus line based on the comparison 1406. For example, if the decoding device determines from the comparison that the decoding of the current data bit on the current bus line will not create a forbidden transition, the decoding device will facilitate decoding of the current data bit on the current bus line. However, if the decoding device determines from the comparison that the decoding of the current data bit on the current bus line will create a forbidden transition, the decoding device will refrain from decoding the current data bit on the current bus line.

The decoding device decodes the current data bit if the current data bit is determined to be decoded based on the comparison 1408. The decoding device discards the current data bit if the current data bit is determined not to be decoded based on the comparison 1410. In an aspect, the current data bit determined not to be decoded is a forced bit/filler bit.

The decoding device recovers a sequential series of data bits based on a plurality of current data bits decoded from the plurality of parallel bus lines 1412.

In an aspect, the decoding device may compare the state of the current data bit received on the current bus line during the current clock cycle (e.g., $b_n$) with one or more conditions related to the current bus line or the at least one bus line adjacent to the current bus line 1404, and determine whether to decode the current data bit on the current bus line based on the comparison 1406, for all bus lines of the plurality of bus lines during one clock cycle.

In a further aspect, the decoding device may compare the state of the current data bit received on the current bus line during the current clock cycle (e.g., b$_n$) with one or more conditions related to the current bus line or the at least one bus line adjacent to the current bus line 1404, and determine whether to decode the current data bit on the current bus line based on the comparison 1406, for each bus line of the plurality of bus lines in a sequential manner.

It is understood that the specific order or hierarchy of steps in the processes disclosed is an illustration of exemplary approaches. The specific order or hierarchy of steps in the processes may be rearranged based upon design preferences. The accompanying method claims present elements of the various steps in a sample order, and are not meant to be limited to the specific order or hierarchy presented.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computing device and/or distributed between two or more computing devices. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of transmitting data bits over a multi-line parallel bus, comprising:
   selecting, from a sequential series of data bits, a plurality of data bits for transmission over a plurality of parallel bus lines; and
   for each bus line of the plurality of parallel bus lines:
      comparing a state of a current data bit selected for transmission on a current bus line during a current clock cycle with a state of two data bits respectively transmitted on two bus lines adjacent to the current bus line during a previous clock cycle, and
      determining whether to transmit the current data bit on the current bus line based on the comparison.

2. The method of claim 1, wherein the comparing further includes comparing the state of the current data bit selected for transmission on the current bus line during the current clock cycle with at least one of:
   a state of a previous data bit transmitted on the current bus line during the previous clock cycle; or
   a state of at least one data bit respectively transmitted on at least one bus line adjacent to the current bus line during the current clock cycle.

3. The method of claim 1, further comprising for each bus line:
   encoding the current data bit if the current data bit is determined to be transmitted on the current bus line based on the comparison; and
   transmitting the encoded data bit via the current bus line.

4. The method of claim 1, further comprising for each bus line:
   transmitting a filler bit via the current bus line if the current data bit is determined not to be transmitted on the current bus line based on the comparison.

5. The method of claim 1, further comprising for each bus line:
   shifting the current data bit onto a subsequent bus line for transmission if the current data bit is determined not to be transmitted on the current bus line.

6. The method of claim 1, wherein the comparing and the determining are performed for all bus lines of the plurality of bus lines during one clock cycle.

7. The method of claim 1, wherein the comparing and the determining are performed for each bus line of the plurality of bus lines in a sequential manner.

8. An apparatus for transmitting data bits over a multi-line parallel bus, comprising:
   a memory; and
   a processing circuit coupled to the memory and configured to:
      select, from a sequential series of data bits, a plurality of data bits for transmission over a plurality of parallel bus lines, and
      for each bus line of the plurality of parallel bus lines:
         compare a state of a current data bit selected for transmission on a current bus line during a current clock cycle with a state of two data bits respectively transmitted on two bus lines adjacent to the current bus line during a previous clock cycle, and
         determine whether to transmit the current data bit on the current bus line based on the comparison.

9. The apparatus of claim 8, wherein the processing circuit configured to compare is further configured to compare the state of the current data bit selected for transmission on the current bus line during the current clock cycle with at least one of:
  a state of a previous data bit transmitted on the current bus line during the previous clock cycle; or
  a state of at least one data bit respectively transmitted on at least one bus line adjacent to the current bus line during the current clock cycle.

10. The apparatus of claim 8, wherein, for each bus line, the processing circuit is further configured to:
  encode the current data bit if the current data bit is determined to be transmitted on the current bus line based on the comparison; and
  transmit the encoded data bit via the current bus line.

11. The apparatus of claim 8, wherein, for each bus line, the processing circuit is further configured to:
  transmit a filler bit via the current bus line if the current data bit is determined not to be transmitted on the current bus line based on the comparison.

12. The apparatus of claim 8, wherein, for each bus line, the processing circuit is further configured to:
  shift the current data bit onto a subsequent bus line for transmission if the current data bit is determined not to be transmitted on the current bus line.

13. The apparatus of claim 8, wherein the processing circuit is configured to perform the comparing and the determining for all bus lines of the plurality of bus lines during one clock cycle.

14. The apparatus of claim 8, wherein the processing circuit is configured to perform the comparing and the determining for each bus line of the plurality of bus lines in a sequential manner.

15. A method of receiving data bits over a multi-line parallel bus, comprising:
  receiving a plurality of data bits over a plurality of parallel bus lines; and
  for each bus line of the plurality of parallel bus lines:
    comparing a state of a current data bit received on a current bus line during a current clock cycle with one or more conditions related to the current bus line or at least one bus line adjacent to the current bus line, wherein the one or more conditions includes a state of two data bits respectively received on two bus lines adjacent to the current bus line during a previous clock cycle, and
    determining whether to decode the current data bit on the current bus line based on the comparison.

16. The method of claim 15, wherein the one or more conditions further includes:
  a state of a previous data bit received on the current bus line during the previous clock cycle; or
  a state of at least one data bit respectively received on the at least one bus line adjacent to the current bus line during the current clock cycle.

17. The method of claim 15, further comprising for each bus line:
  decoding the current data bit if the current data bit is determined to be decoded based on the comparison; and
  discarding the current data bit if the current data bit is determined not to be decoded based on the comparison.

18. The method of claim 17, further comprising:
  recovering a sequential series of data bits based on a plurality of current data bits decoded from the plurality of parallel bus lines.

19. The method of claim 17, wherein the current data bit determined not to be decoded comprises a filler bit.

20. The method of claim 15, wherein the comparing and the determining are performed for all bus lines of the plurality of bus lines during one clock cycle.

21. The method of claim 15, wherein the comparing and the determining are performed for each bus line of the plurality of bus lines in a sequential manner.

22. An apparatus for receiving data bits over a multi-line parallel bus, comprising:
  a memory; and
  a processing circuit coupled to the memory and configured to:
    receive a plurality of data bits over a plurality of parallel bus lines, and
    for each bus line of the plurality of parallel bus lines:
      compare a state of a current data bit received on a current bus line during a current clock cycle with one or more conditions related to the current bus line or at least one bus line adjacent to the current bus line, wherein the one or more conditions includes a state of two data bits respectively received on two bus lines adjacent to the current bus line during a previous clock cycle, and
      determine whether to decode the current data bit on the current bus line based on the comparison.

23. The apparatus of claim 22, wherein the one or more conditions further includes:
  a state of a previous data bit received on the current bus line during the previous clock cycle; or
  a state of at least one data bit respectively received on the at least one bus line adjacent to the current bus line during the current clock cycle.

24. The apparatus of claim 22, wherein, for each bus line, the processing circuit is further configured to:
  decode the current data bit if the current data bit is determined to be decoded based on the comparison; and
  discard the current data bit if the current data bit is determined not to be decoded based on the comparison.

25. The apparatus of claim 24, wherein the processing circuit is further configured to:
  recover a sequential series of data bits based on a plurality of current data bits decoded from the plurality of parallel bus lines.

26. The apparatus of claim 24, wherein the current data bit determined not to be decoded is a filler bit.

27. The apparatus of claim 22, wherein the processing circuit is configured to perform the comparing and the determining for all bus lines of the plurality of bus lines during one clock cycle.

28. The apparatus of claim 22, wherein the processing circuit is configured to perform the comparing and the determining for each bus line of the plurality of bus lines in a sequential manner.

* * * * *